(12) United States Patent
Schlegel

(10) Patent No.: US 11,813,929 B2
(45) Date of Patent: Nov. 14, 2023

(54) ADJUSTABLE LIGHT SHIELD

(71) Applicant: Niles Schlegel, Peabody, MA (US)

(72) Inventor: Niles Schlegel, Peabody, MA (US)

( * ) Notice: Subject to any disclaimer, the term of this patent is extended or adjusted under 35 U.S.C. 154(b) by 0 days.

(21) Appl. No.: 18/107,789

(22) Filed: Feb. 9, 2023

(65) Prior Publication Data

US 2023/0249525 A1    Aug. 10, 2023

Related U.S. Application Data

(60) Provisional application No. 63/308,478, filed on Feb. 9, 2022.

(51) Int. Cl.
*B60J 3/02*    (2006.01)

(52) U.S. Cl.
CPC .................................. *B60J 3/0208* (2013.01)

(58) Field of Classification Search
CPC .................................. B60J 3/0208; B60J 3/04
USPC .............................. 296/97.6, 97.11, 12, 6, 13
See application file for complete search history.

(56) References Cited

U.S. PATENT DOCUMENTS

| | | | | |
|---|---|---|---|---|
| 3,415,569 A * | 12/1968 | Leevo | ...................... | B60J 3/0208 |
| | | | | 296/97.6 |
| 4,362,330 A * | 12/1982 | Cramer | .................. | B60J 3/0208 |
| | | | | 296/97.3 |
| 4,736,979 A * | 4/1988 | Harvey | .................. | B60J 3/0208 |
| | | | | 296/97.8 |
| 4,792,176 A * | 12/1988 | Karford | ................. | B60J 3/0208 |
| | | | | 296/97.8 |
| 5,016,938 A * | 5/1991 | Tschan | ................... | B60J 3/0208 |
| | | | | 296/97.8 |
| 5,259,657 A * | 11/1993 | Arendt | .................... | B60J 3/0208 |
| | | | | 296/97.8 |
| 5,580,117 A * | 12/1996 | Goclowski | ............. | B60J 3/0208 |
| | | | | 296/97.9 |
| 7,540,553 B1 * | 6/2009 | Mullis | .................... | B60J 3/0208 |
| | | | | 296/97.8 |
| 7,731,265 B1 * | 6/2010 | Cohen | ................... | B60J 3/0208 |
| | | | | 296/97.9 |
| 9,302,568 B2 * | 4/2016 | Kim | .......................... | B60J 3/04 |

FOREIGN PATENT DOCUMENTS

| | | | | |
|---|---|---|---|---|
| CN | | 115107476 A * | 9/2022 | |
| WO | | WO-9408811 A1 * | 4/1994 | ............ B60J 3/0208 |

OTHER PUBLICATIONS

Niles Schlegel, Sun Visor Research and Brainstorming, 8 pages (Sep. 1, 2022).

* cited by examiner

*Primary Examiner* — Pinel E Romain

(74) *Attorney, Agent, or Firm* — Barnes & Thornburg LLP

(57) ABSTRACT

An adjustable light shield includes a hollow cover and an elongated slide. The hollow cover is transparent so as to enable a user to see through the cover and includes an elongated slot formed in each side wall of the cover. The elongated slide includes a first window formed therethrough and a second window formed therethrough spaced apart longitudinally from the first window. A light blocking portion of the slide is located between the first window and the second window The elongated slide is arranged within and supported by the elongated slots of the cover so as to enable the slide to slidably move relative to the cover. The slide is configured to be slid relative to the cover into a position such that a light source, such as the sun, is blocked by the light blocking portion of the slide.

20 Claims, 22 Drawing Sheets

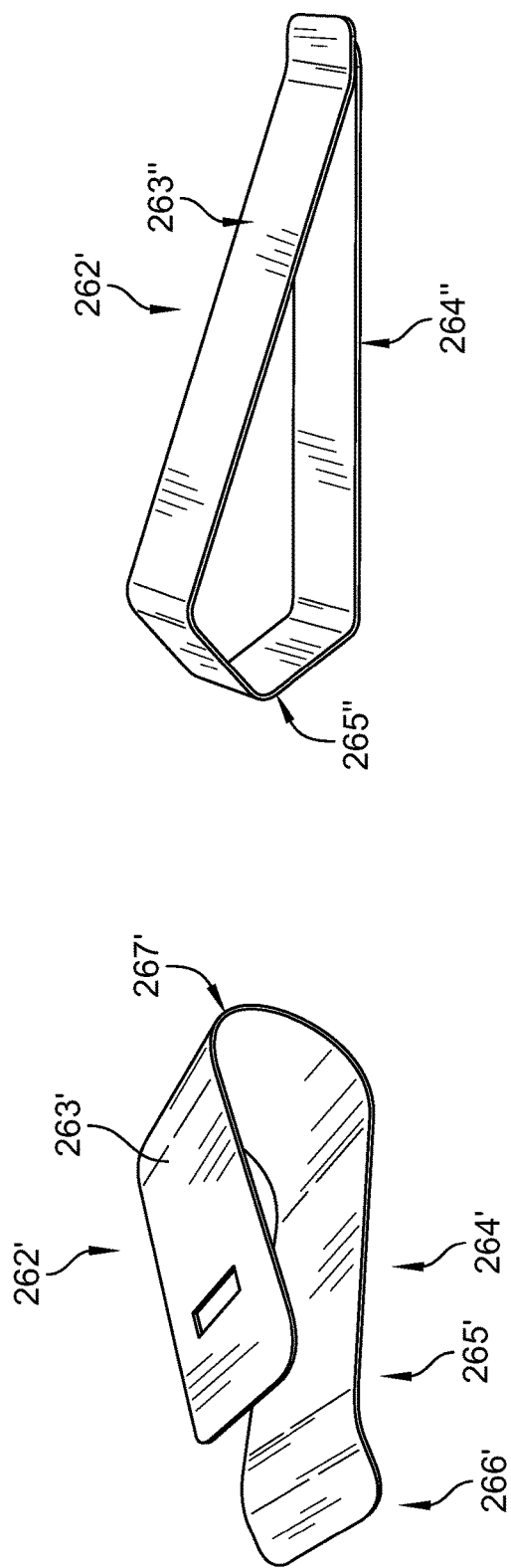
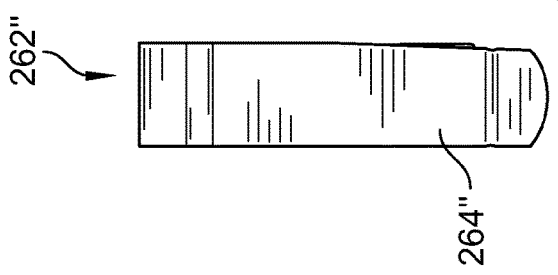
FIG. 12B
FIG. 12C
FIG. 12A

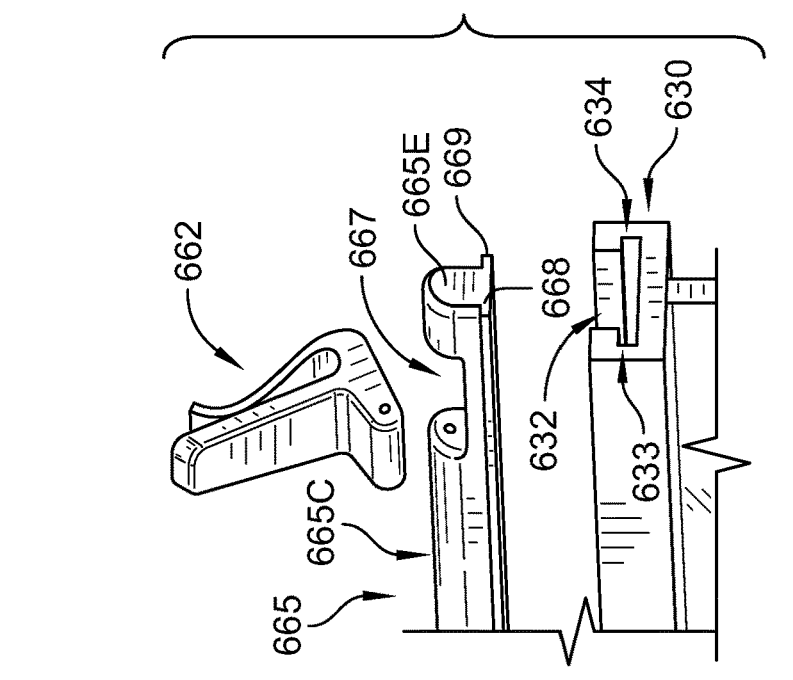
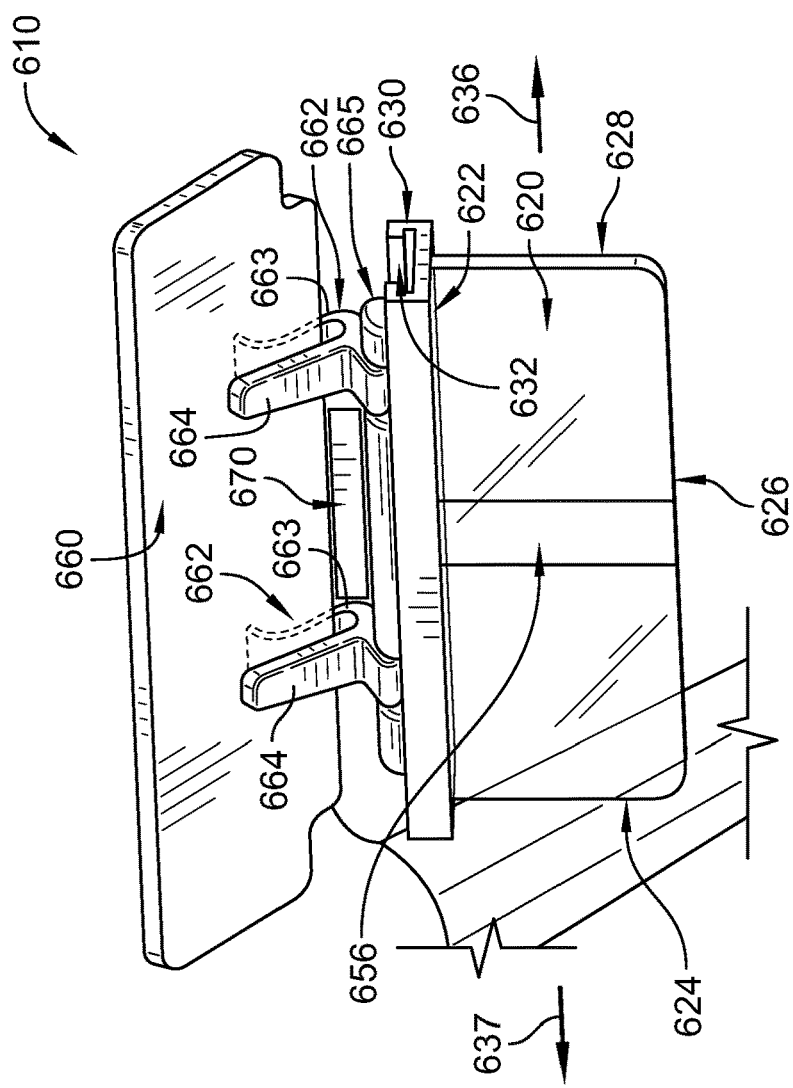
FIG. 16B
FIG. 16A

ADJUSTABLE LIGHT SHIELD

CROSS-REFERENCE TO RELATED APPLICATIONS

This application claims the benefit of priority of U.S. Provisional Application No. 63/308,478, which was filed on Feb. 9, 2022, the disclosure of which is incorporated herein by reference in its entirety.

BACKGROUND

The sun may present challenges to vehicle drivers viewing the road through their windshields, in particular when the sun is positioned in the sky such that it is directly viewable through the windshield. When the sun shines too directly into the eyes of the driver, the light can hinder the driver's ability to view the road and safely navigate the vehicle. Typically, a driver may attempt to eliminate some of the light of the sun by lowering the sun visor of the vehicle, but this may be unhelpful when the sun is not positioned directly behind the sun visor. Moreover, a driver may attempt to eliminate some of the light of the sun by squinting his or her eyes or closing one eye, but this is a safety hazard due to the limited view of the driver.

As such, it would be advantageous to provide a system that at least partially eliminates sunlight from a driver's view when viewing the road through the windshield of a vehicle.

SUMMARY

According to a first aspect of the present disclosure, an adjustable light shield includes a hollow cover and a slide. The hollow cover includes a first side wall, a second side wall opposite to the first side wall, and a top wall extending between and interconnecting the first side wall and the second side wall, the hollow cover being transparent so as to enable a user to see through the cover, the first side wall and the second side wall each including an elongated slot formed therethrough, the top wall having a first longitudinal length.

In some embodiments, the elongated slide includes a first window formed therethrough and a second window formed therethrough spaced apart longitudinally from the first window, the first window and the second window being arranged relative to each other such that a light blocking portion of the slide located between the first window and the second window is located centrally along a longitudinal extent of the elongated slide, the elongated slide having a second longitudinal length that is larger than the first longitudinal length of the top wall of the hollow cover, the elongated slide arranged within and supported by the elongated slots of the first side wall and the second side wall so as to enable the slide to slidably move through the elongated slots and slidably move relative to the hollow cover.

In some embodiments, the elongated slide is configured to be slid relative to the hollow cover into a first position such that a light source present in an environment surrounding the adjustable light shield is at least partially blocked by the light blocking portion of the slide.

In some embodiments, the elongated slide extends beyond the first side wall of the hollow cover a first distance and extends beyond the second side wall of the hollow cover a second distance, and the first distance and the second distance are larger than a third distance between the first window and the first side wall and a fourth distance between the second window and the second side wall.

In some embodiments, the elongated slide includes a first end and a second end longitudinally opposite the first end, and the elongated slide includes a first stop extending away from the first end and a second stop extending away from the second end so as to prevent the elongated slide from sliding beyond the elongated slots of the hollow cover.

In some embodiments, the elongated slide further includes a blocking strip arranged on a front surface of the elongated slide on the light blocking portion, and the blocking strip is a different color than a color of the elongated slide so as to visually indicate movement of the elongated slide to a user.

In some embodiments, the elongated slide includes a top edge that is parallel with the top wall of the hollow cover. The first side wall and the second side wall of the hollow cover are parallel with each other. The first window and the second window are arranged relative to each other such that a light blocking portion of the slide located between the first window and the second window is located centrally along a longitudinal extent of the elongated slide.

In some embodiments, a first width of the blocking strip is equal to a second width of the light blocking portion. In some embodiments, the second width of the light blocking portion is equal to a distance between the first window and the second window, and the second width is equal to 0.5 inches.

In some embodiments, the first window is circular and the second window is circular, and the first window and the second window have equal diameters. In some embodiments, the first window has a diameter of 2 inches and the second window has a diameter of 2 inches.

In some embodiments, the first longitudinal length of the elongated slide is equal to 10.5 inches, and the second longitudinal length of the top wall of the hollow cover is equal to 6 inches. In some embodiments, a first height of the elongated slide is equal to 2.3 inches, and a second height of the hollow cover is equal to 2.75 inches. In some embodiments, the first longitudinal length of the elongated slide is equal to 12 inches, and the second longitudinal length of the top wall of the hollow cover is equal to 6 inches.

According to another aspect of the present disclosure, a system for at least partially eliminating sunlight visible through a windshield of a vehicle includes an adjustable light shield and an attachment strap. The adjustable light shield is configured to be attached to a sun visor of the vehicle and includes a hollow cover and an elongated slide. The hollow cover includes a first side wall, a second side wall opposite to the first side wall, and a top wall extending between and interconnecting the first side wall and the second side wall, the hollow cover being transparent so as to enable a user to see through the cover, the first side wall and the second side wall each including an elongated slot formed therethrough, the top wall having a first longitudinal length.

In some embodiments, the elongated slide includes a first window formed therethrough and a second window formed therethrough spaced apart longitudinally from the first window, the first window and the second window being arranged relative to each other such that a light blocking portion of the slide located between the first window and the second window is located centrally along a longitudinal extent of the elongated slide, the elongated slide having a second longitudinal length that is larger than the first longitudinal length of the top wall of the hollow cover, the elongated slide arranged within and supported by the elongated slots of the first side wall and the second side wall so as to enable the slide to slidably move through the elongated slots and slidably move relative to the hollow cover.

In some embodiments, the elongated slide is configured to be slid relative to the hollow cover into a first position such that a light source present in an environment surrounding the adjustable light shield is at least partially blocked by the light blocking portion of the slide. The attachment strap is coupled to the hollow cover and configured to be coupled to the sun visor of the vehicle so as to secure the adjustable light shield to the sun visor.

In some embodiments, the elongated slide extends beyond the first side wall of the hollow cover a first distance and extends beyond the second side wall of the hollow cover a second distance, and the first distance and the second distance are larger than a third distance between the first window and the first side wall and a fourth distance between the second window and the second side wall.

In some embodiments, the elongated slide includes a first end and a second end longitudinally opposite the first end, and the elongated slide includes a first stop extending away from the first end and a second stop extending away from the second end so as to prevent the elongated slide from sliding beyond the elongated slots of the hollow cover.

In some embodiments, the elongated slide further includes a blocking strip arranged on a front surface of the elongated slide on the light blocking portion, and the blocking strip is a different color than a color of the elongated slide so as to visually indicate movement of the elongated slide to a user.

In some embodiments, the elongated slide includes a top edge that is parallel with the top wall of the hollow cover. The first side wall and the second side wall of the hollow cover are parallel with each other. The first window and the second window are arranged relative to each other such that a light blocking portion of the slide located between the first window and the second window is located centrally along a longitudinal extent of the elongated slide.

In some embodiments, a first width of the blocking strip is equal to a second width of the light blocking portion.

According to another aspect of the present disclosure, a method of blocking a light source includes providing a hollow cover including a first side wall, a second side wall opposite to the first side wall, and a top wall extending between and interconnecting the first side wall and the second side wall, the hollow cover being transparent so as to enable a user to see through the cover, the first side wall and the second side wall each including an elongated slot formed therethrough, the top wall having a first longitudinal length.

In some embodiments, the method further includes arranging an elongated slide within the elongated slots of the first side wall and the second side wall such that the elongated slide is slidably supported by the elongated slots so as to enable the slide to slidably move through the elongated slots and slidably move relative to the hollow cover, the elongated slide having a second longitudinal length that is larger than the first longitudinal length of the top wall of the hollow cover, the elongated slide including a first window formed therethrough and a second window formed therethrough spaced apart longitudinally from the first window, the first window and the second window being arranged relative to each other such that a light blocking portion of the slide located between the first window and the second window is located centrally along a longitudinal extent of the elongated slide.

In some embodiments, the method further includes sliding the elongated slide relative to the hollow cover into a first position such that a light source present in an environment surrounding the adjustable light shield is at least partially blocked by the light blocking portion of the slide.

In some embodiments, the elongated slide extends beyond the first side wall of the hollow cover a first distance and extends beyond the second side wall of the hollow cover a second distance, and the first distance and the second distance are larger than a third distance between the first window and the first side wall and a fourth distance between the second window and the second side wall.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which.

Figure 6:
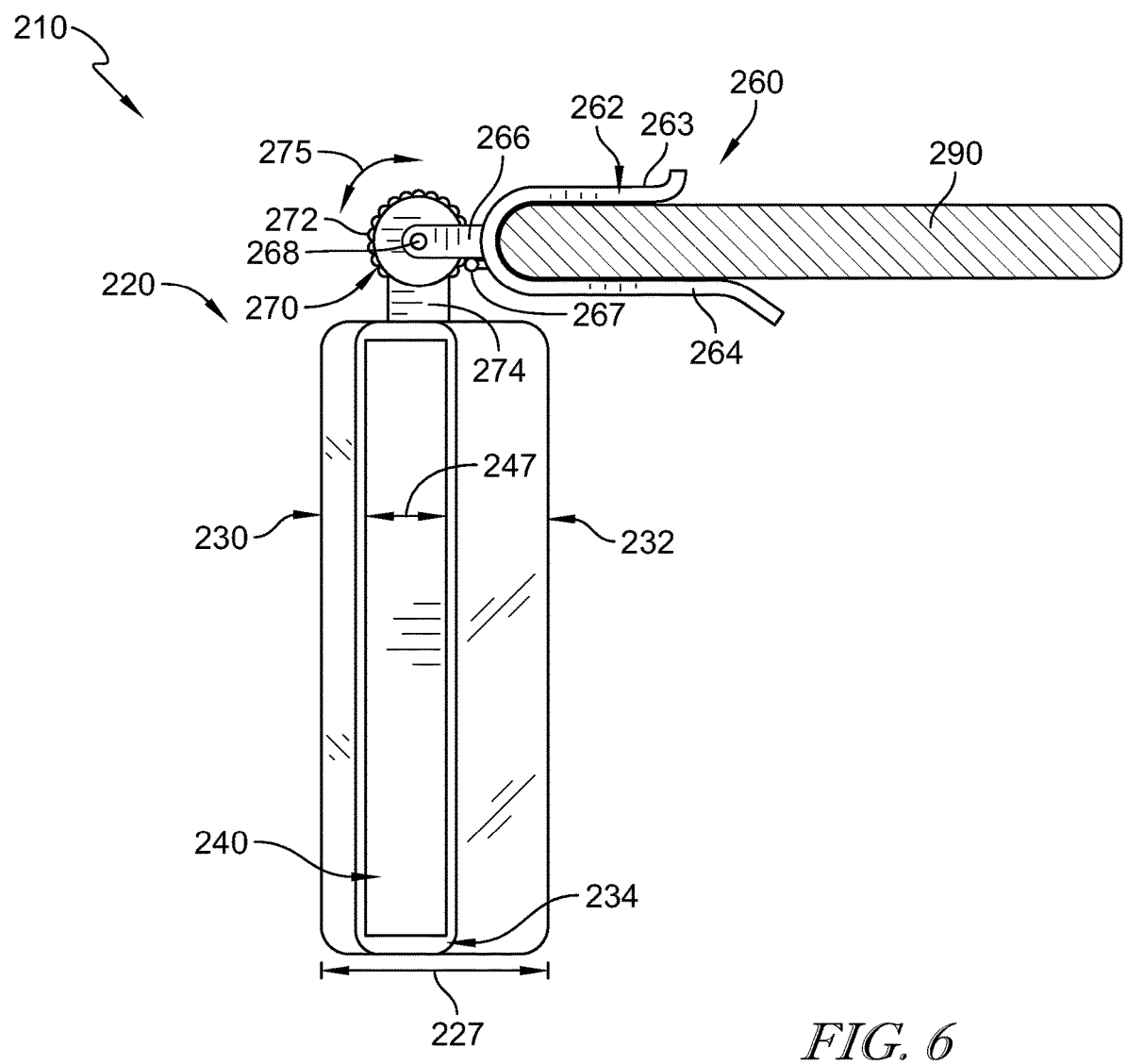
Figure 7A:
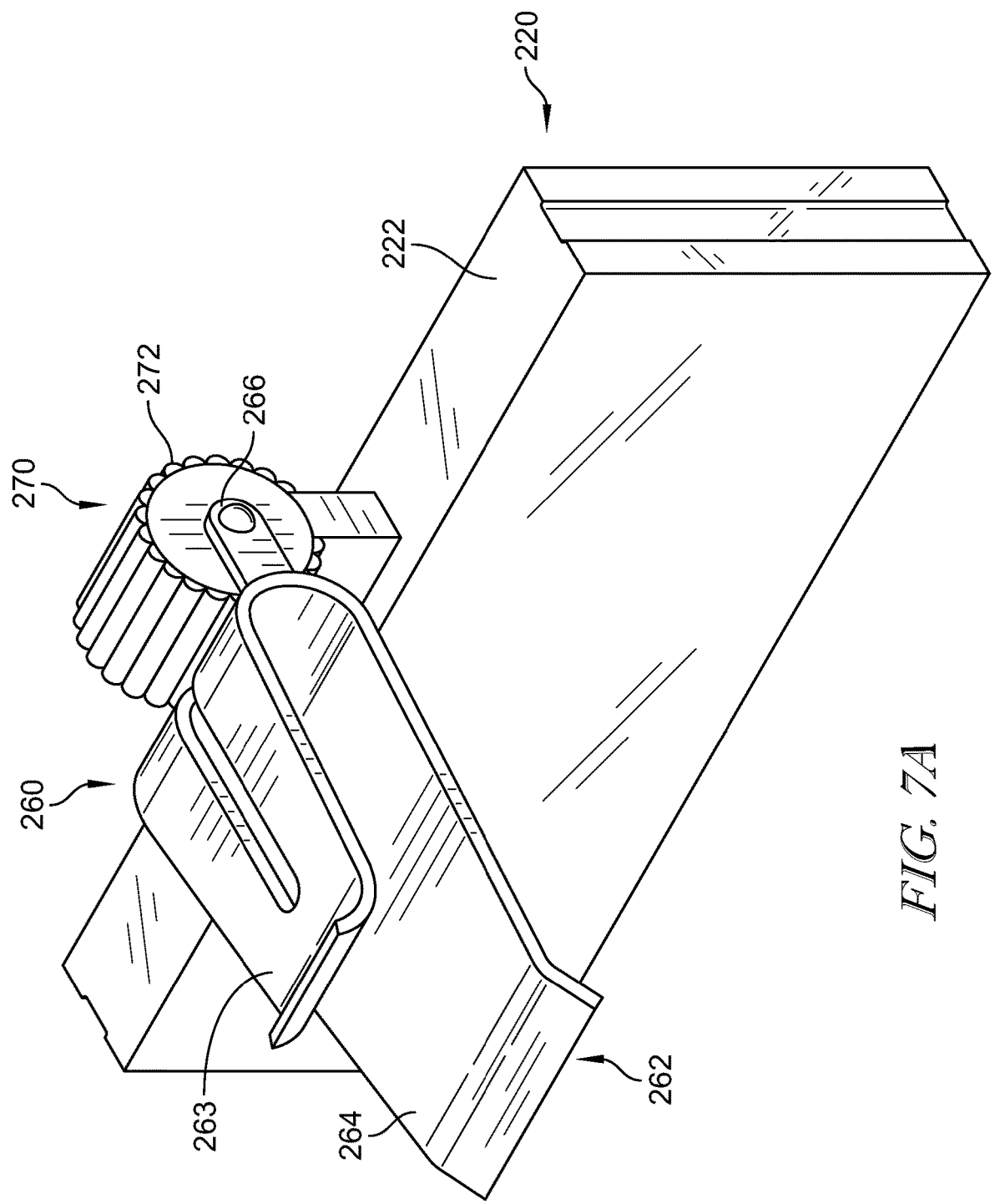
Figure 7B:
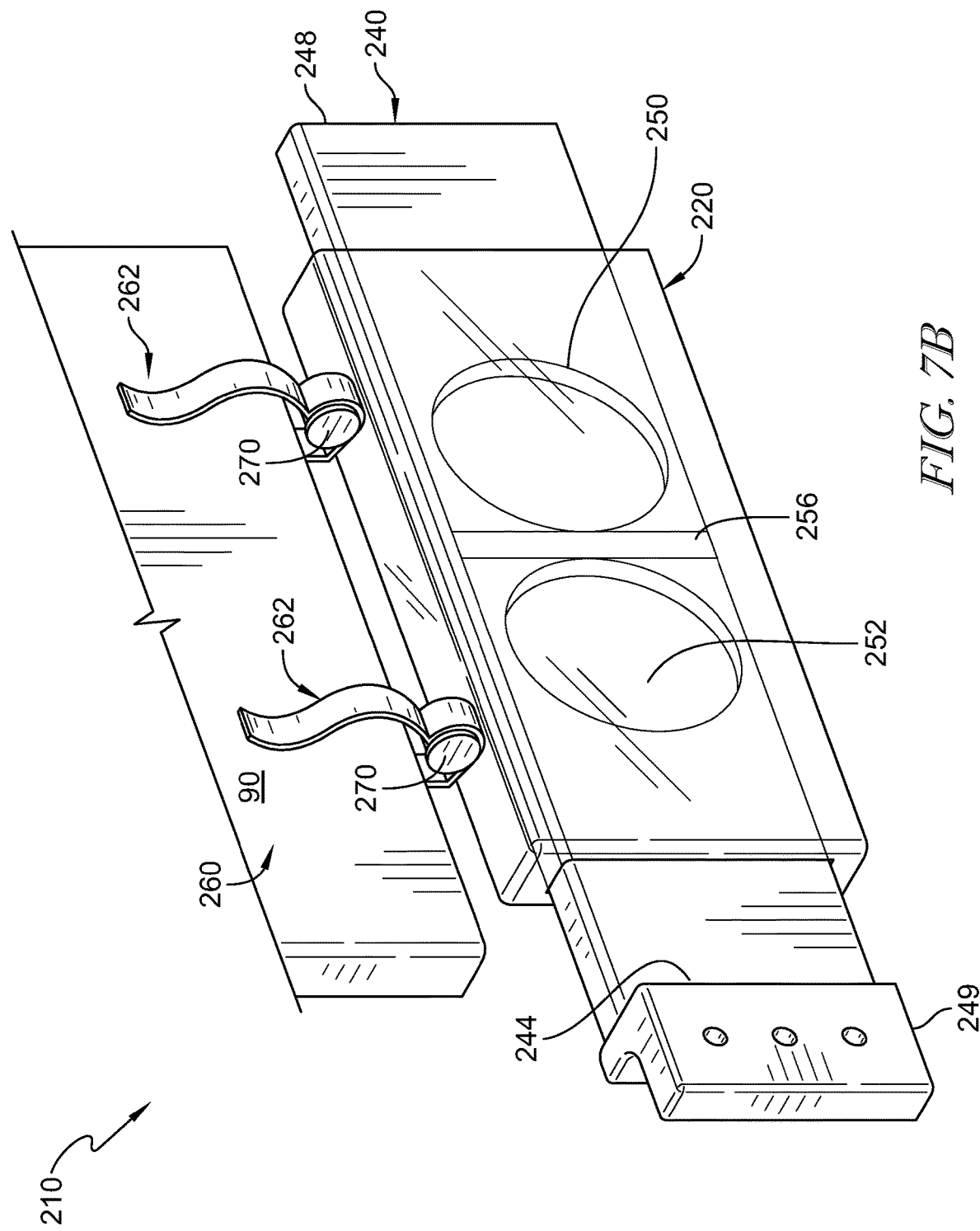
Figure 8:
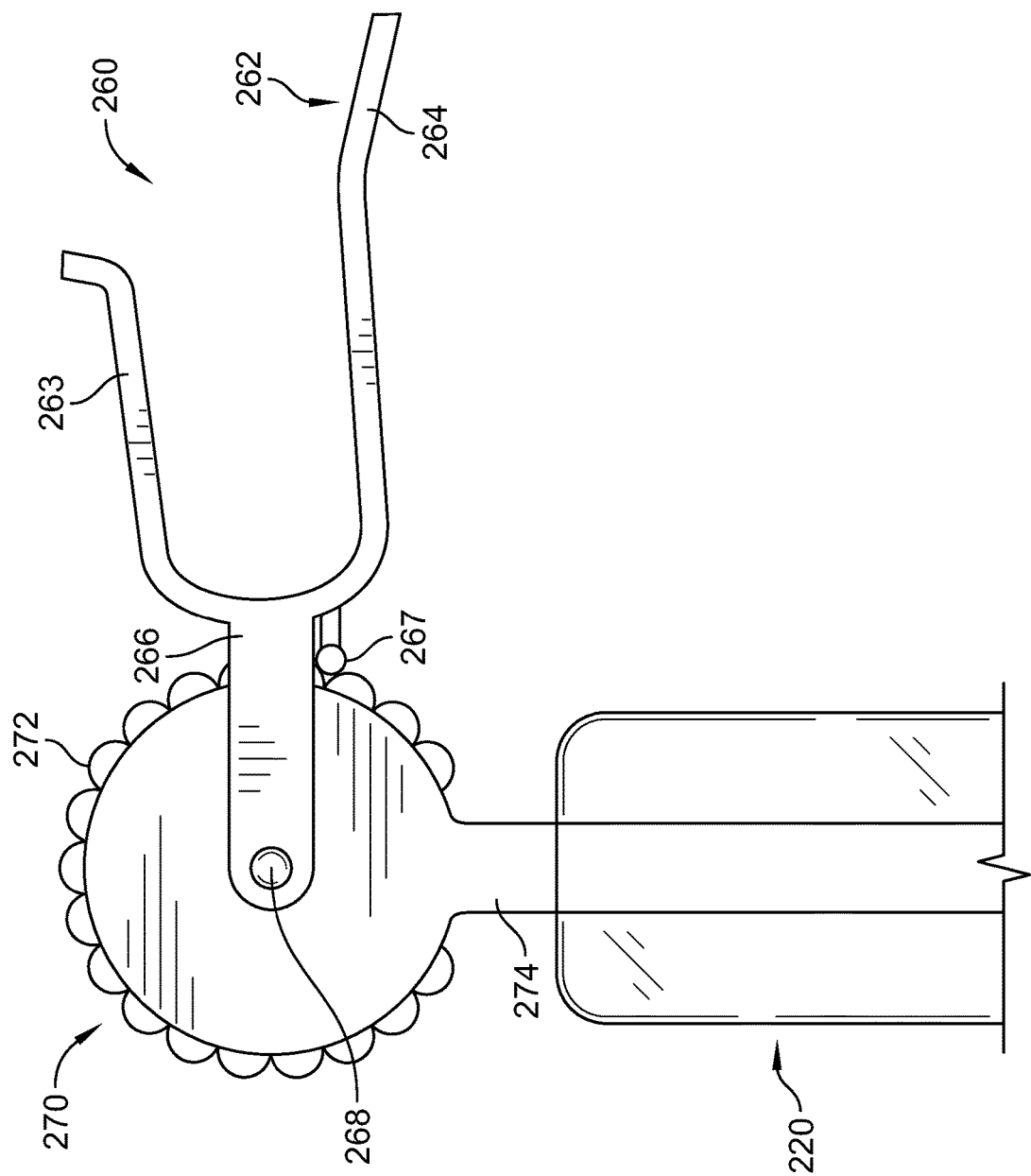
Figure 9:
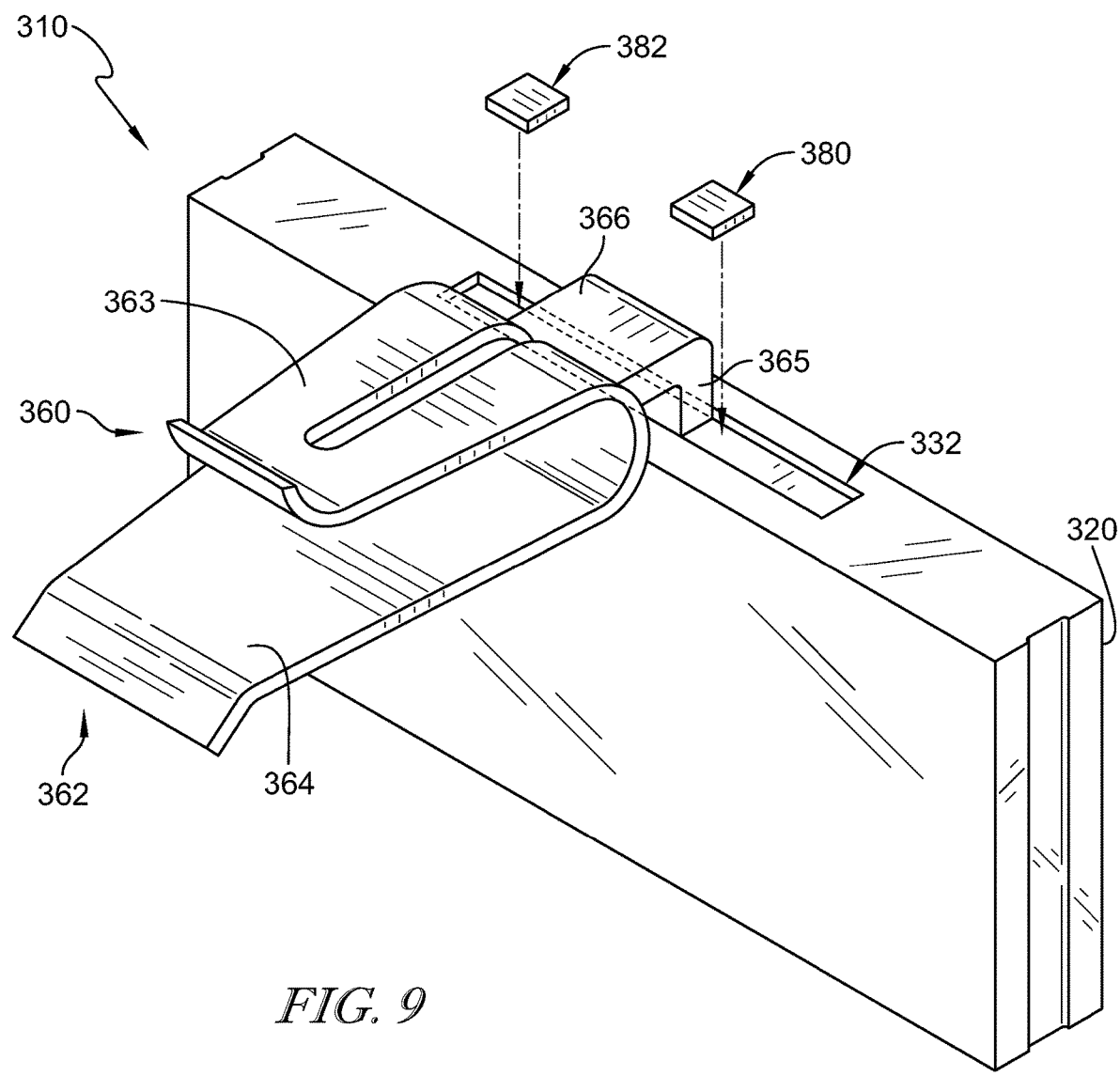
Figure 10:
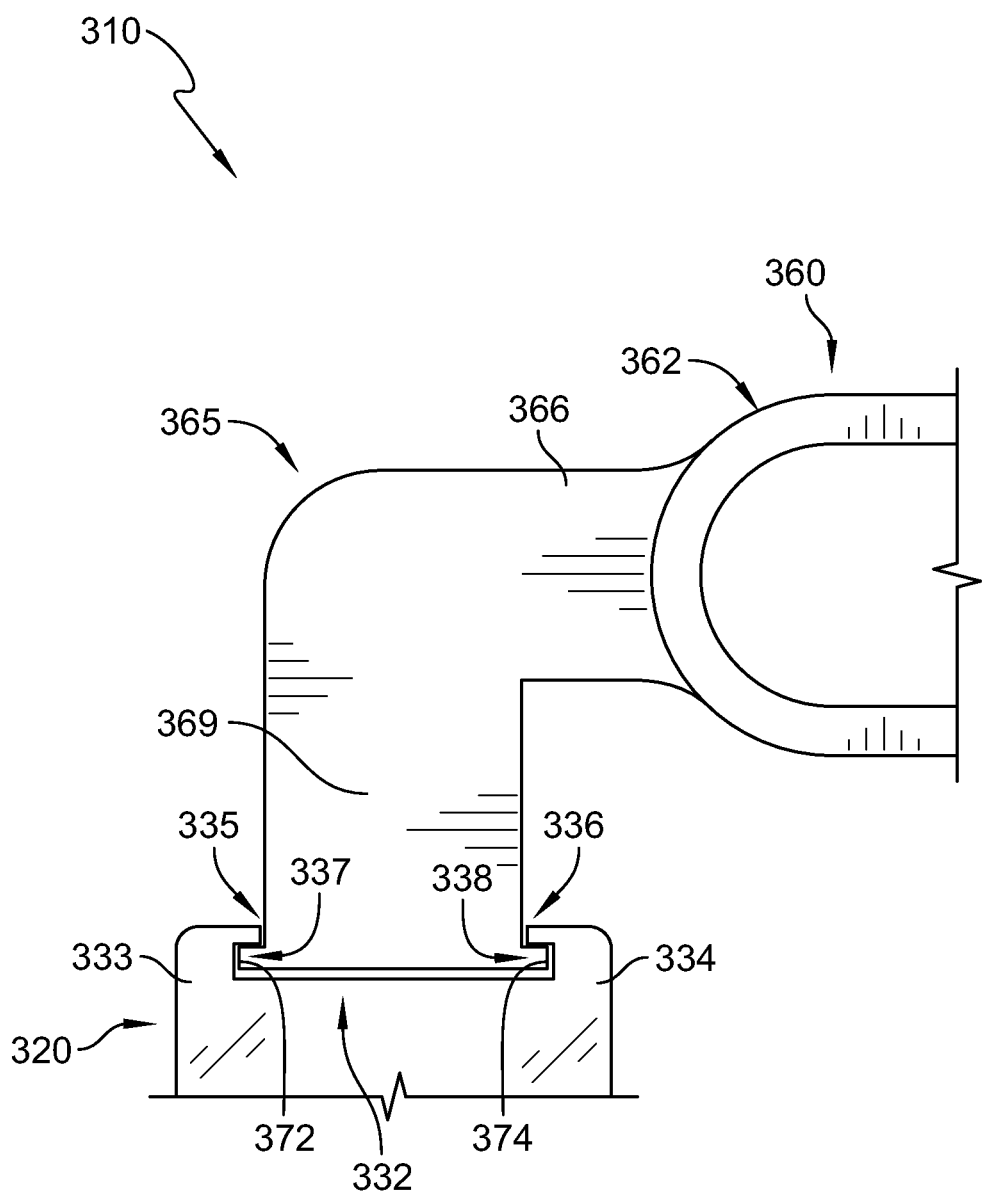
Figure 11:
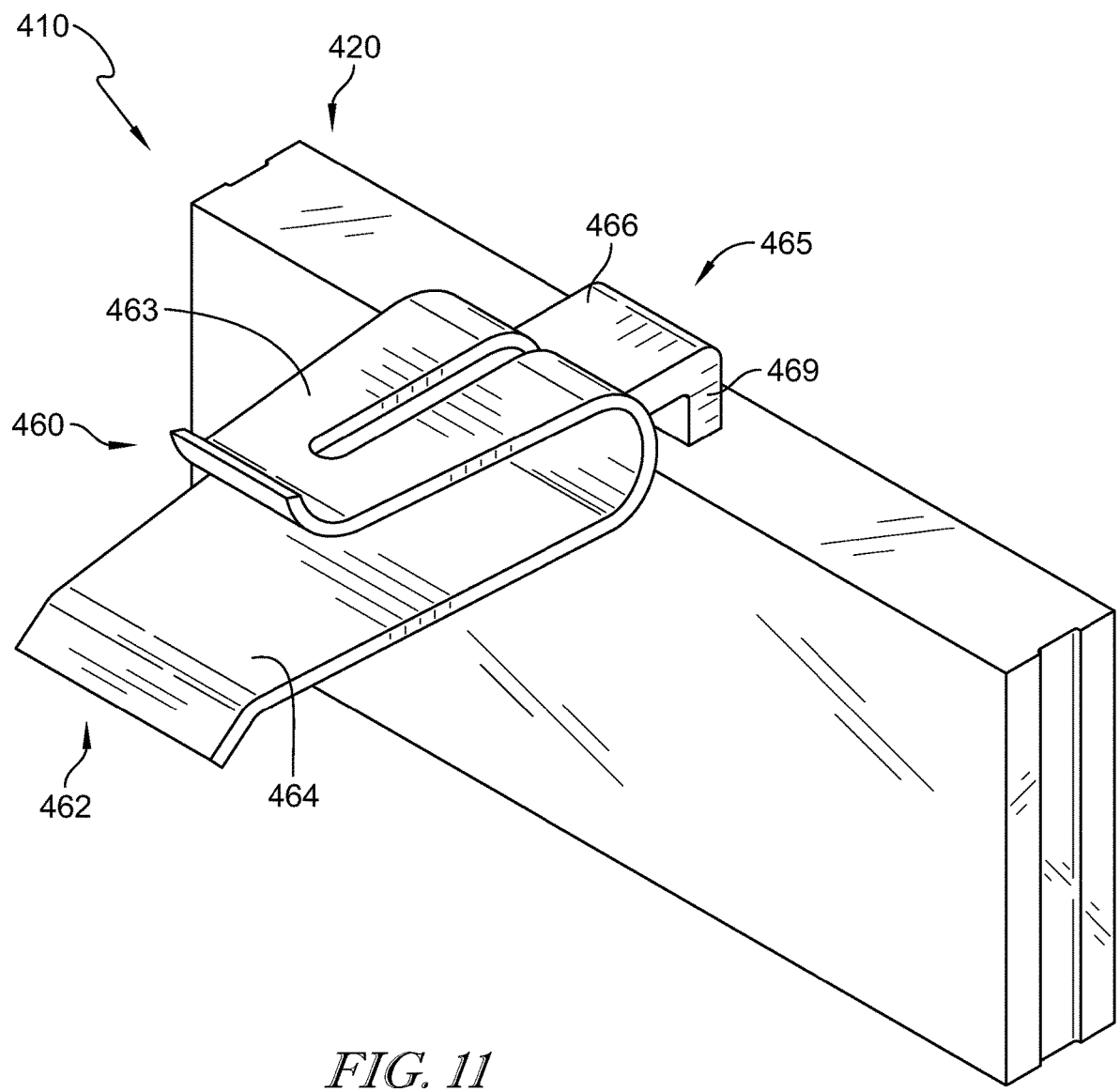
Figure 12D:
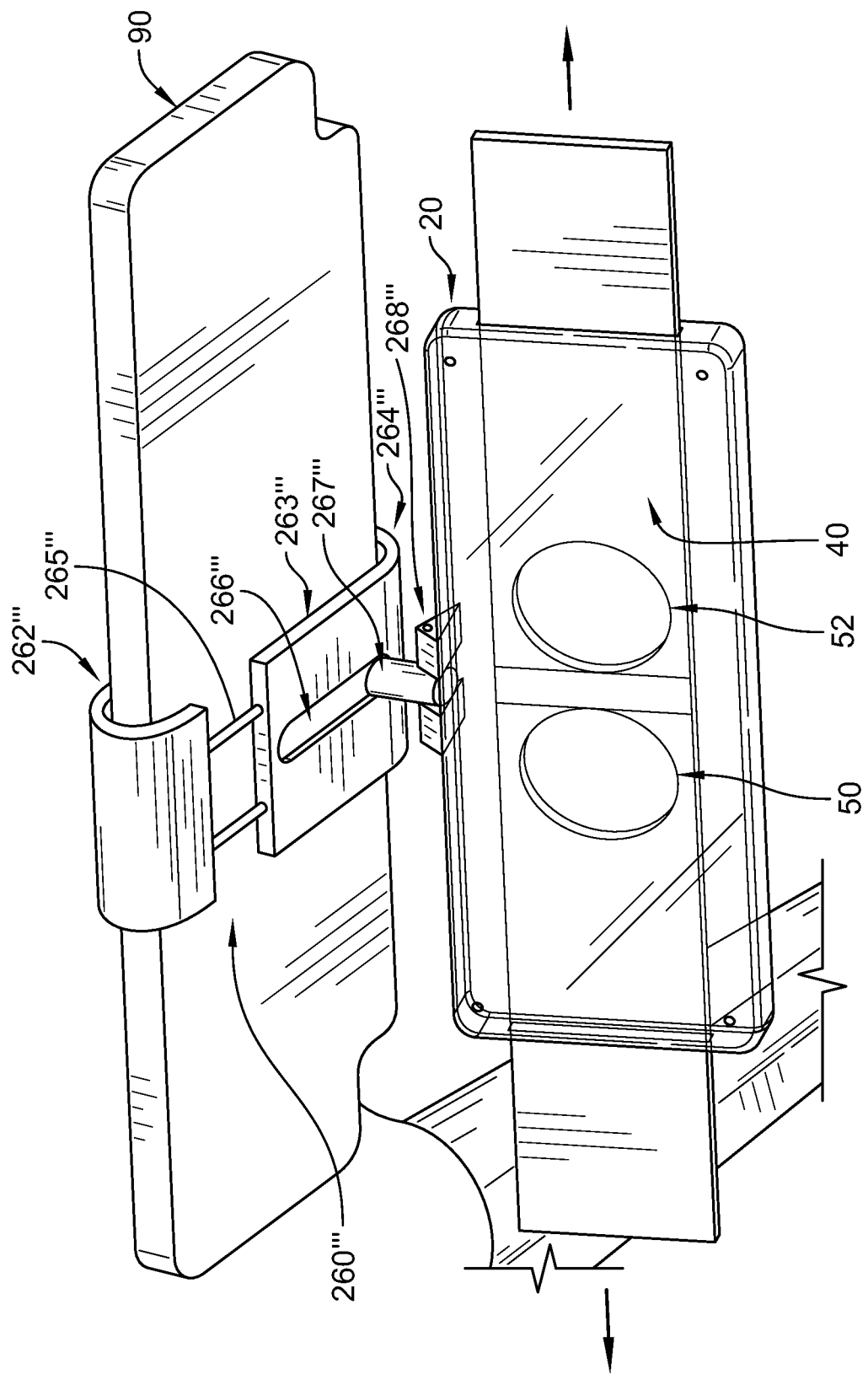
Figure 13:
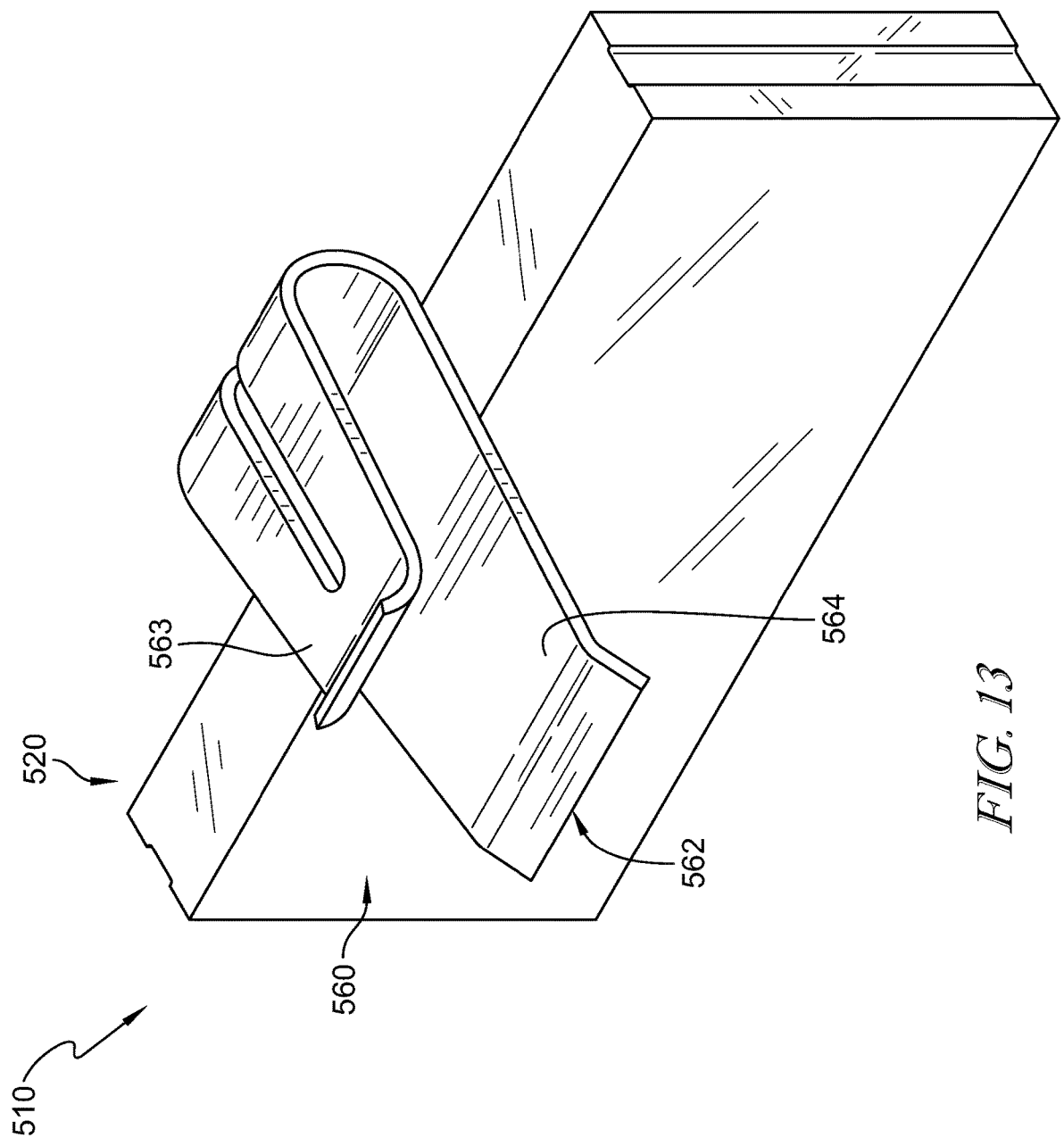
Figure 14:
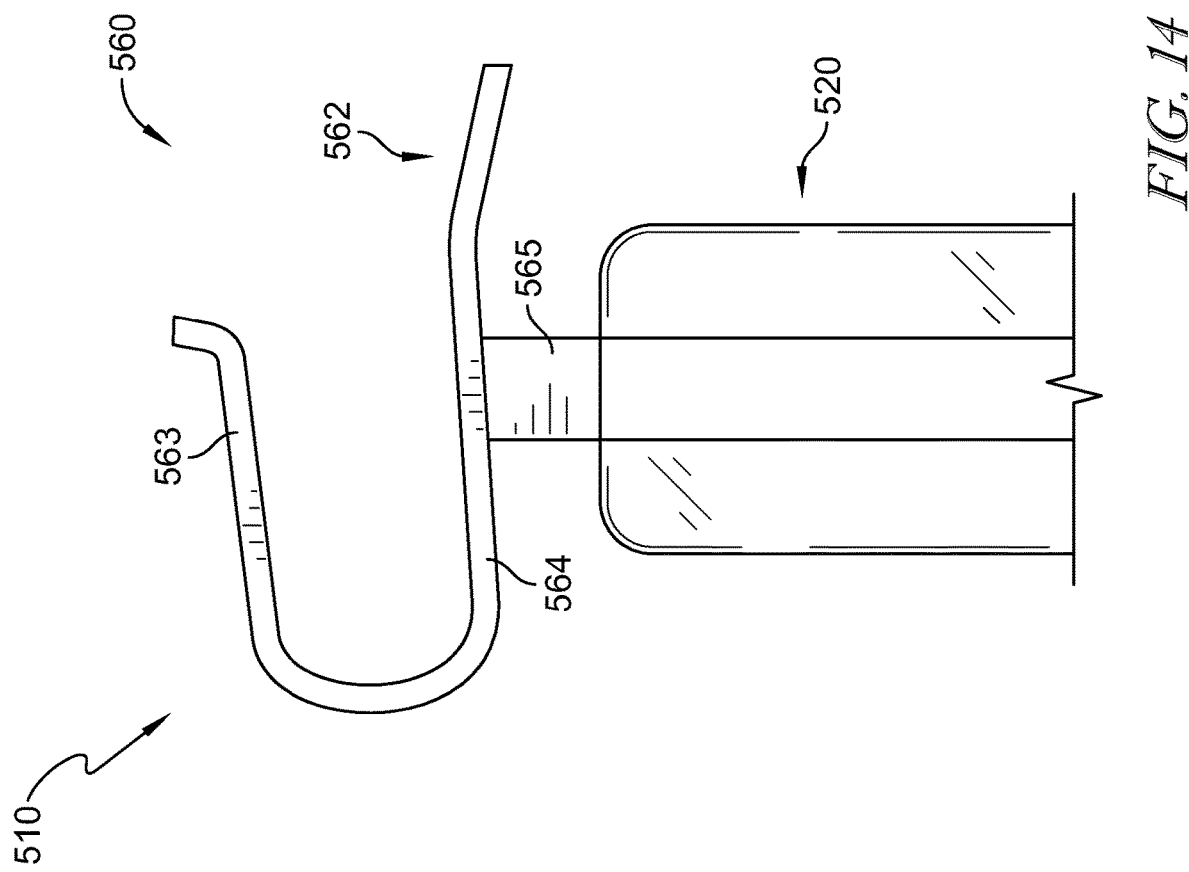
Figure 15:
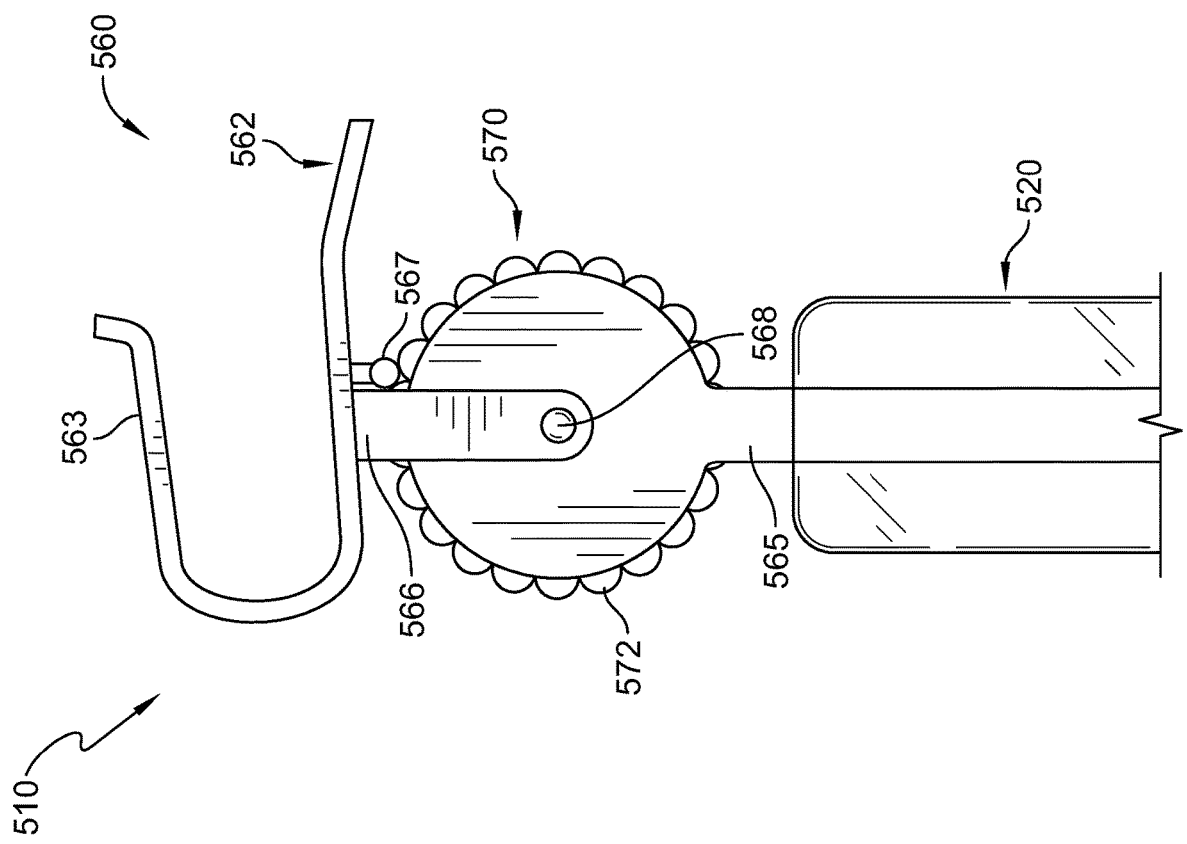
Figure 17:
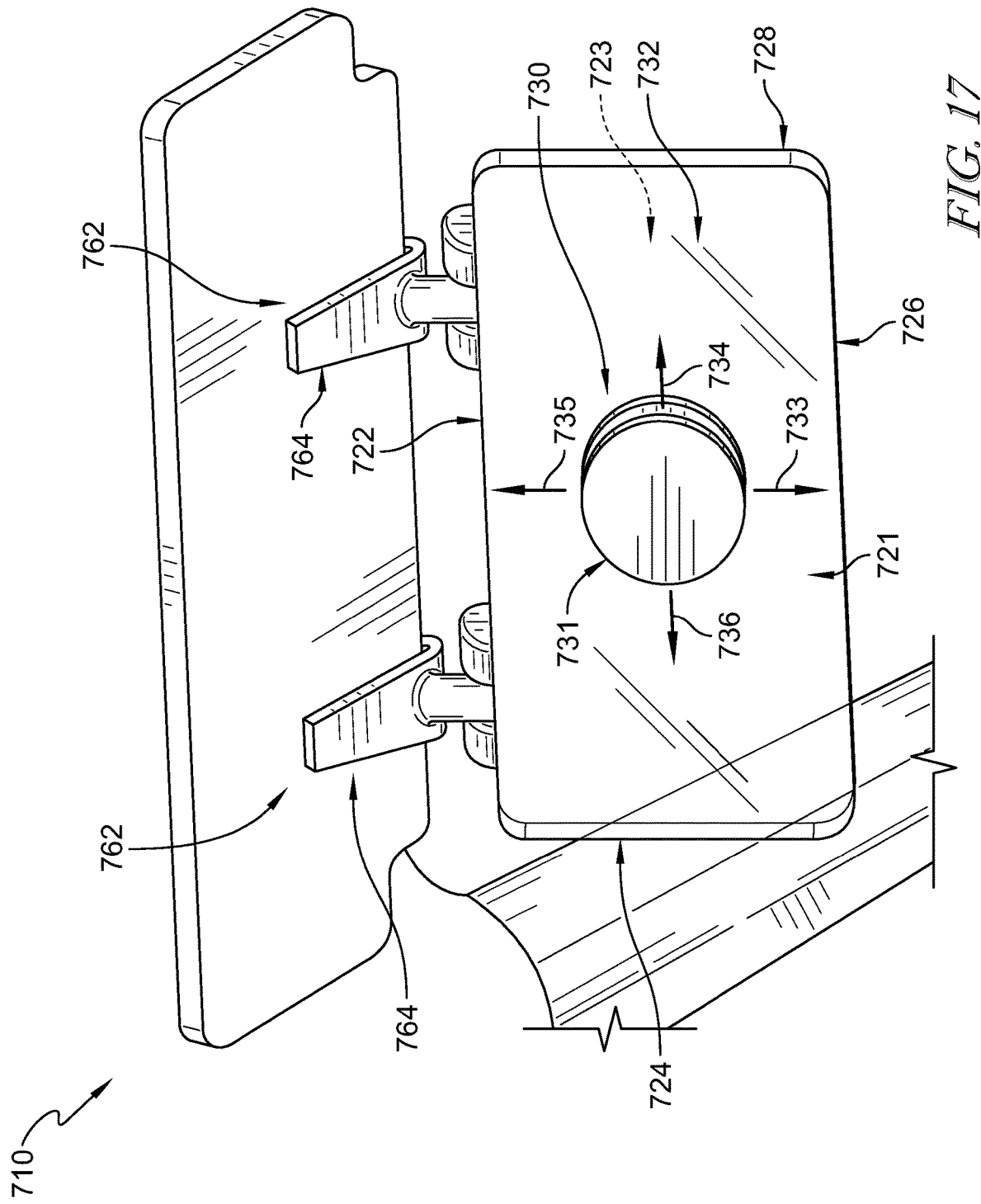
Figure 18:
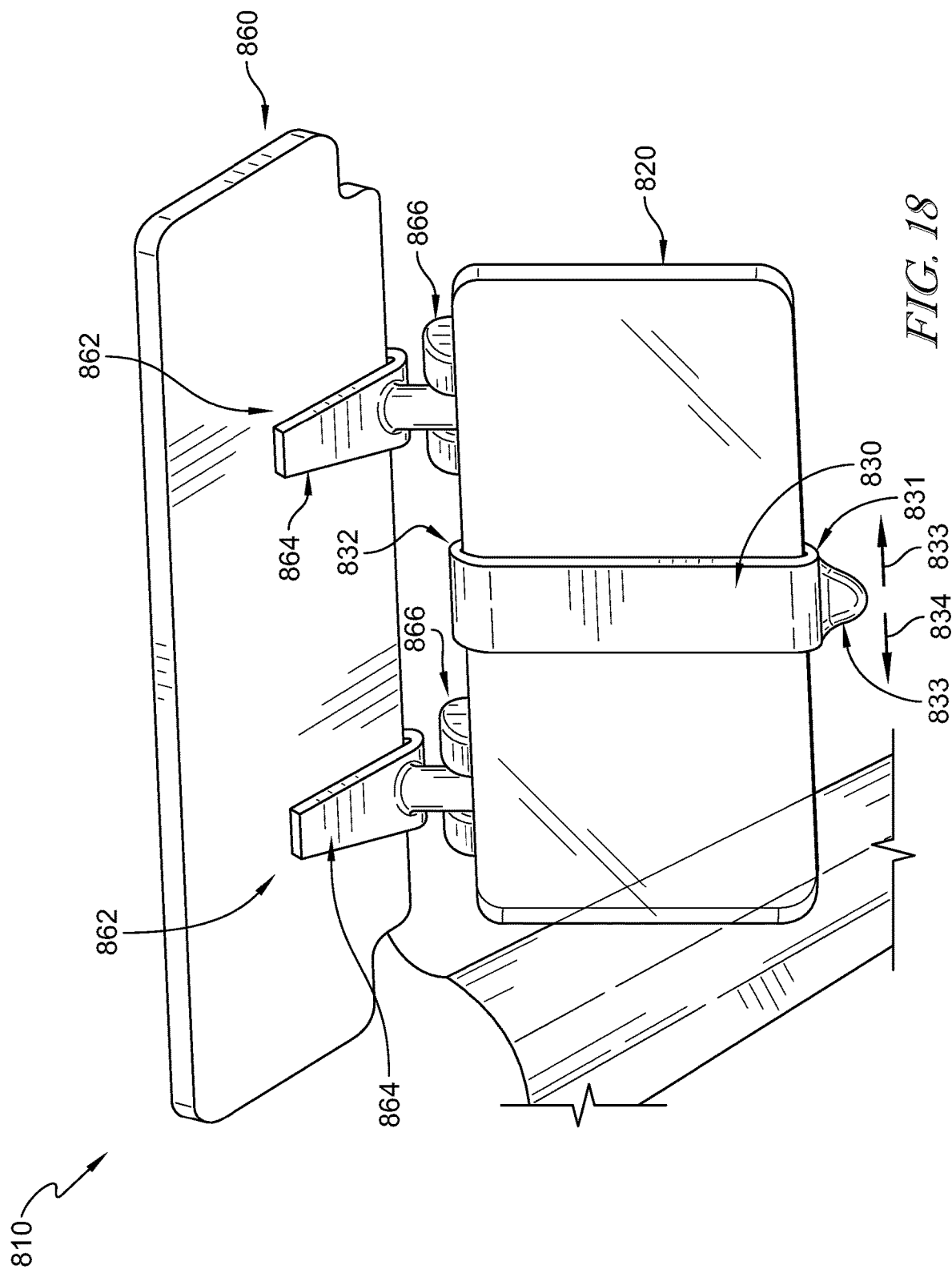
Figure 19:
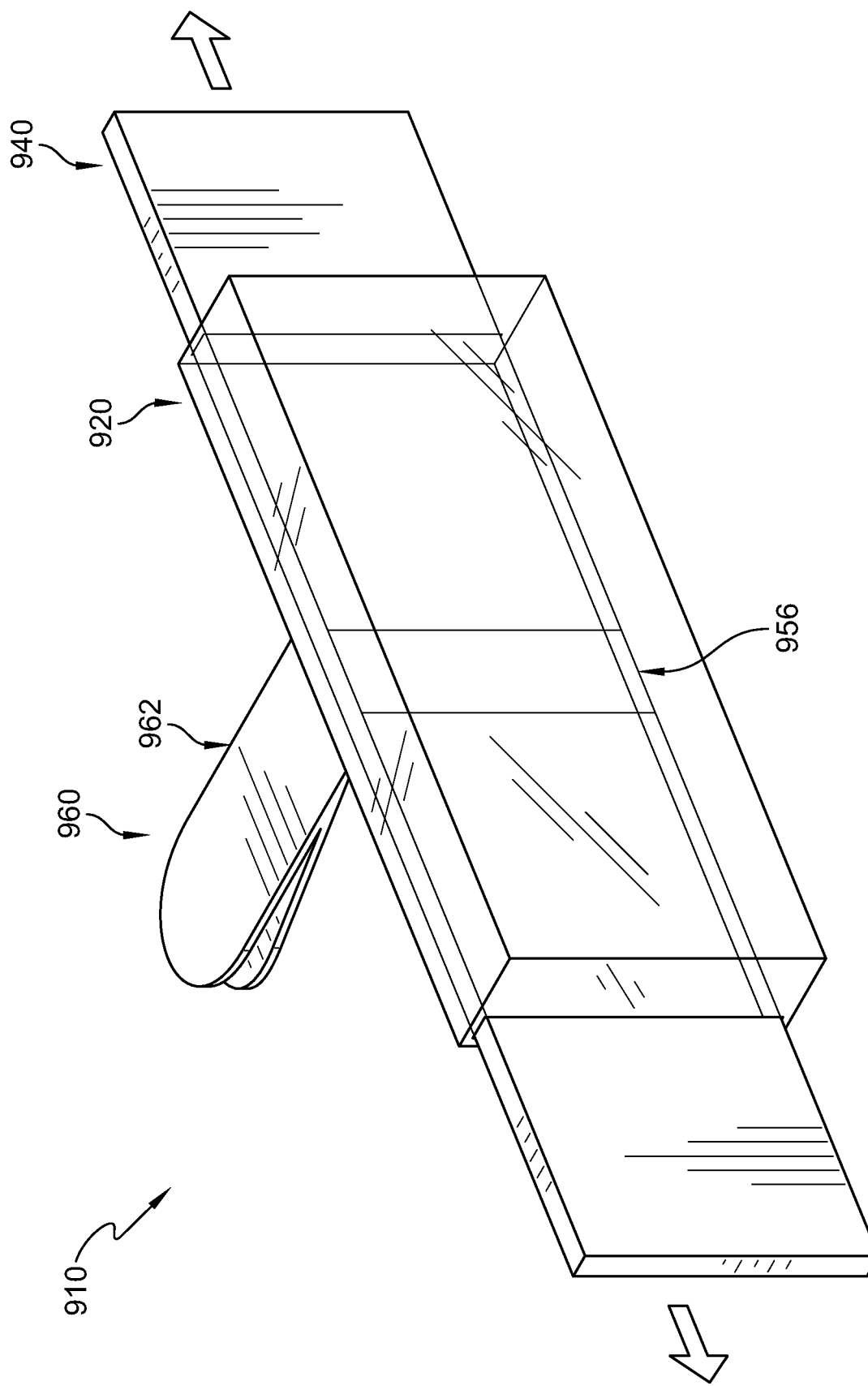

FIG. 6 is a side view of an adjustable light shield according to the present disclosure, showing the adjustable light shield including a hollow cover and a slide movable within the hollow cover, the slide having windows formed therethrough, and showing that the hollow cover is coupled to a sun visor via an adjustable attachment assembly including a clamp and a rotatable member coupled to a top side of the hollow cover;

FIG. 7A is a perspective view of the adjustable light shield of FIG. 6;

FIG. 7B is a perspective view of the adjustable light shield of FIG. 6 showing that the slide can include a grip;

FIG. 8 is a side view of the rotatable member of the adjustable attachment assembly of the adjustable light shield of FIG. 6;

FIG. 9 is a perspective view of an adjustable light shield according to the present disclosure, showing the adjustable light shield including a hollow cover and a slide movable within the hollow cover, the slide having windows formed therethrough, showing that the hollow cover is coupled to a sun visor via a rigid coupling member, and showing that the hollow cover is slidable relative to the rigid coupling member;

FIG. 10 is a side view of the rigid coupling member of the adjustable light shield of FIG. 9;

FIG. 11 is a perspective view of an adjustable light shield according to the present disclosure, showing the adjustable light shield including a hollow cover and a slide movable within the hollow cover, the slide having windows formed therethrough, and showing that the hollow cover is coupled to a sun visor via a rigid coupling member;

FIG. 12A is a perspective view of a clamp of an adjustable attachment assembly according to the present disclosure configured to be utilized with the adjustable light shields disclosed herein;

FIG. 12B is a perspective view of a clamp of an adjustable attachment assembly according to the present disclosure configured to be utilized with the adjustable light shields disclosed herein;

FIG. 12C is a bottom view of the clamp of FIG. 12B;

FIG. 12D is a perspective view of an adjustable attachment assembly according to the present disclosure configured to be utilized with the adjustable light shields disclosed herein, showing the adjustable attachment assembly enabling forward and rearward sliding of the hollow cover;

FIG. 13 is a perspective view of an adjustable light shield according to the present disclosure, showing the adjustable light shield including a hollow cover and a slide movable within the hollow cover, the slide having windows formed therethrough, and showing that the hollow cover is coupled to a sun visor via a rigid coupling member, the hollow cover being located beneath the rigid coupling member;

FIG. 14 is a side view of the rigid coupling member and the hollow cover of the adjustable light shield of FIG. 12;

FIG. 15 is a side view of the rigid coupling member and the hollow cover of the adjustable light shield of FIG. 12, showing that the hollow cover can be rotatably coupled to the rigid coupling member;

FIG. 16A is a perspective view of an adjustable light shield according to the present disclosure, showing the adjustable light shield including a slidable hollow cover and an adjustable attachment assembly including two clamps relative to which the hollow cover slides, and showing that the hollow cover is transparent and includes a blocking strip arranged centrally on the hollow cover;

FIG. 16B is an exploded view of the clamp, the coupling rail, and the slidable hollow cover of the adjustable light shield of FIG. 16B;

FIG. 17 is a perspective view of an adjustable light shield according to the present disclosure, showing the adjustable light shield including a stationary hollow cover and an adjustable attachment assembly including two clamps, and showing the hollow cover being transparent and including a blocker slidable in all two-dimensional directions relative to the hollow cover;

FIG. 18 is a perspective view of an adjustable light shield according to the present disclosure, showing the adjustable light shield including a stationary hollow cover and an adjustable attachment assembly including two clamps, and showing the hollow cover being transparent and including a blocker strip slidable in the lateral directions relative to the hollow cover; and FIG. 19 is a perspective view of an adjustable light shield according to the present disclosure, showing the adjustable light shield including a stationary hollow cover and a slide that is slidable relative to the hollow cover, and showing both the hollow cover and the slide being transparent, the slide including a blocking strip arranged centrally thereon.

DETAILED DESCRIPTION

A first embodiment of an adjustable light shield 10 according to the present disclosure is shown in FIGS. 1-4. A second embodiment of an adjustable light shield 110 according to the present disclosure is shown in FIG. 5. A third embodiment of an adjustable light shield 210 according to the present disclosure is shown in FIGS. 6-8. A fourth embodiment of an adjustable light shield 310 according to the present disclosure is shown in FIGS. 9 and 10. A fifth embodiment of an adjustable light shield 410 according to the present disclosure is shown in FIG. 11. A sixth embodiment of an adjustable light shield 510 according to the present disclosure is shown in FIGS. 13-15. A seventh embodiment of an adjustable light shield 610 according to the present disclosure is shown in FIGS. 16A and 16B. An eighth embodiment of an adjustable light shield 710 according to the present disclosure is shown in FIG. 17. A ninth embodiment of an adjustable light shield 810 according to the present disclosure is shown in FIG. 18. A tenth embodiment of an adjustable light shield 910 according to the present disclosure is shown in FIG. 19.

An adjustable light shield 10 is shown in FIGS. 1-4. The light shield 10 may be utilized to at least partially eliminate sunlight from a driver's view when viewing the road through the windshield of a vehicle (not shown). A person skilled in the art would understand that the light shield 10 may be utilized in other applications as well.

The light shield 10 includes a transparent hollow cover 20 and a slide 40 arranged within the hollow cover 20 and configured to slide relative to the hollow cover 20. The hollow cover 20 is configured to be coupled to the sun visor 90 of a vehicle and positioned in front of the eyes of the driver via an attachment member such as an attachment assembly 60. The slide 40 includes two windows 50, 52 through which a driver of the vehicle may view the road. A light blocking portion 54 of the slide 40 is located between the two windows 50, 52. The driver may slide the slide 40 to the left and to the right within the hollow cover 20 such that the light blocking portion 54 blocks a light source that is obstructing the view of the driver, while allowing the driver to still see a majority of the road through the windows 50, 52. In at least one exemplary embodiment, the light source is the sun.

Figure 1:
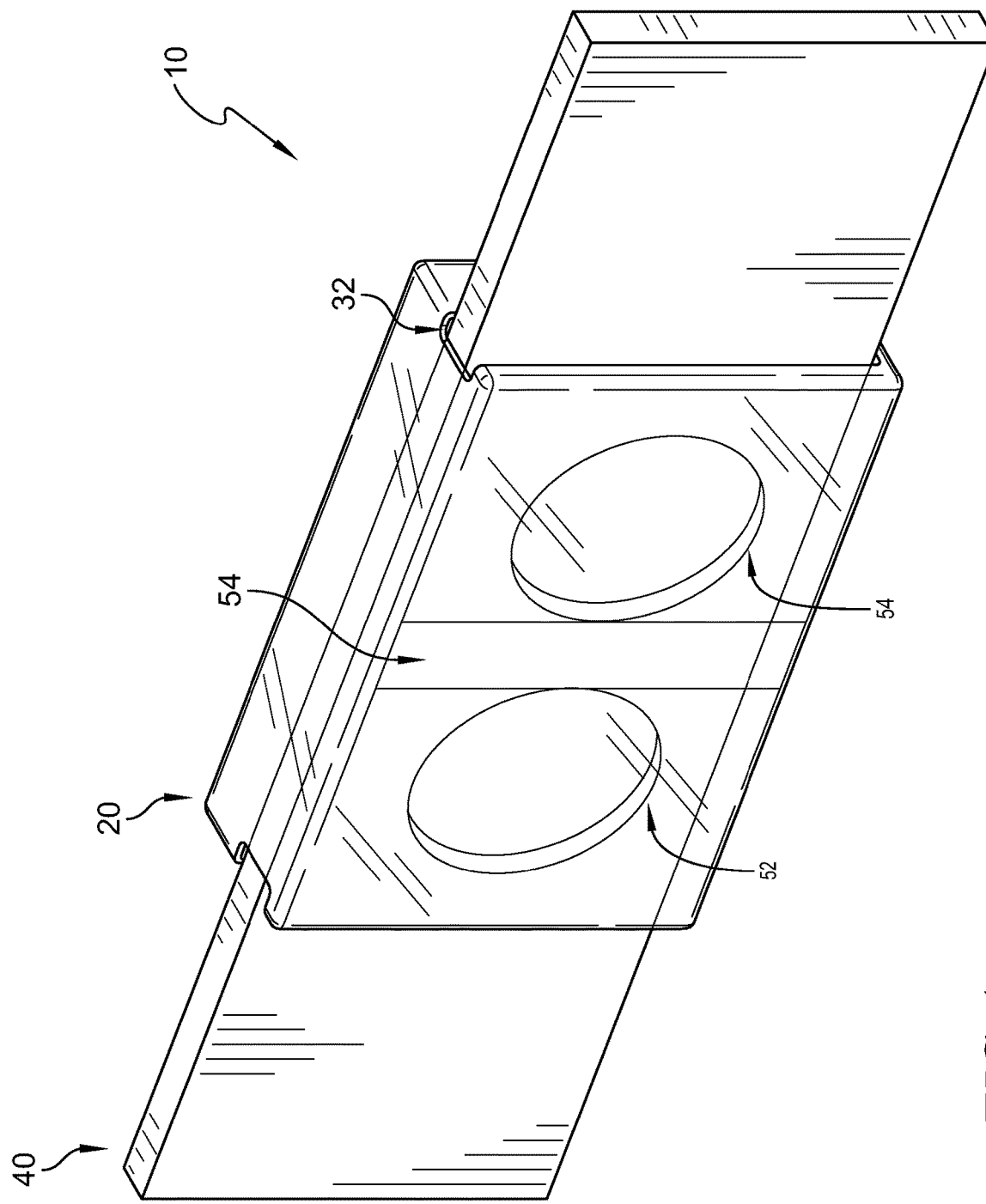
FIG. 1 is a perspective view of an adjustable light shield according to the present disclosure, showing the adjustable light shield including a hollow cover and a slide movable within the hollow cover, the slide having windows formed therethrough.
Figure 2:
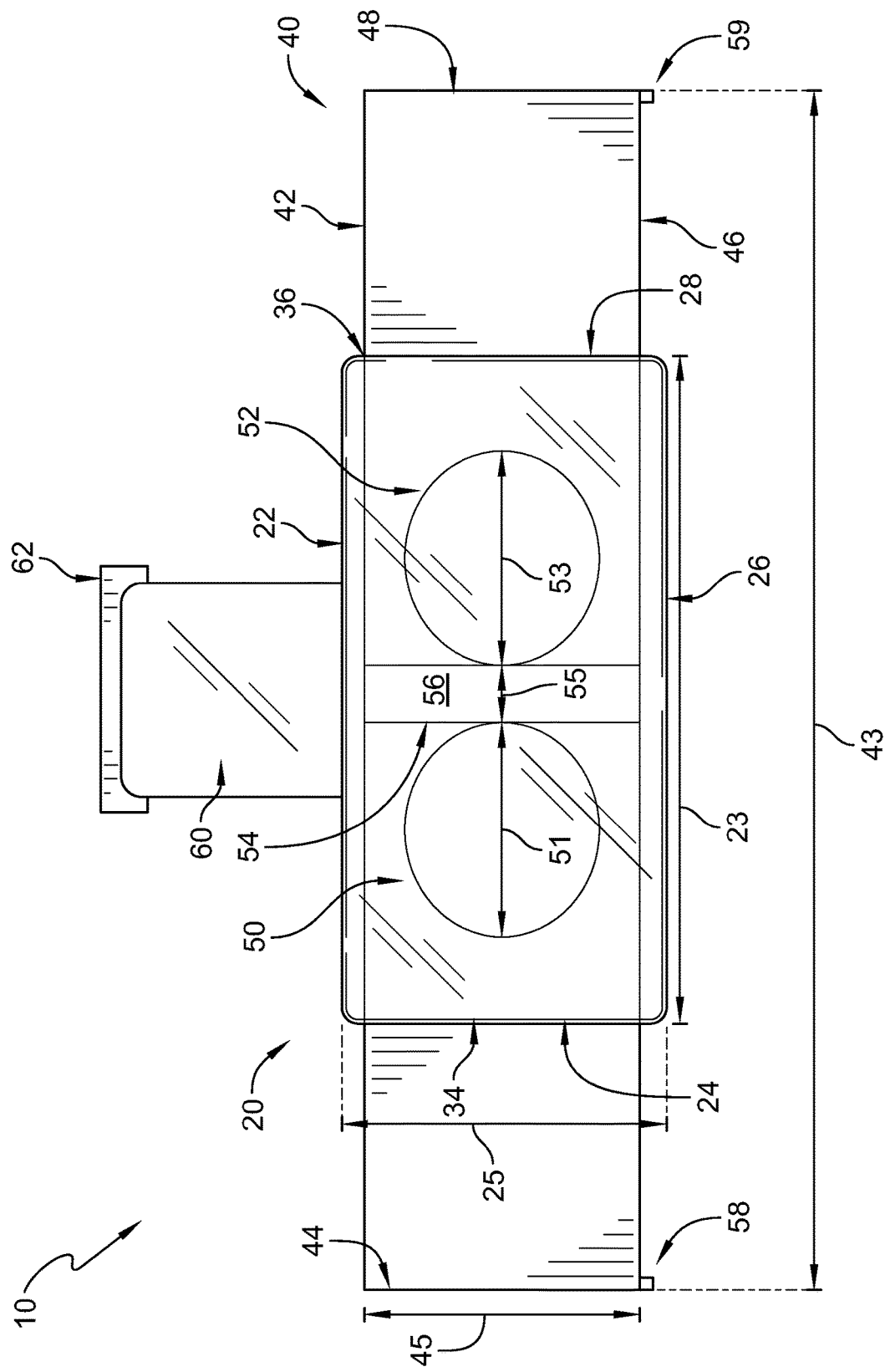
FIG. 2 is a front view of the adjustable light shield of FIG. 1, showing the slide having a blocking strip between the windows, and showing the adjustment light shield includes a strap for attachment to a sun visor.

As shown in greater detail in FIG. 2, the hollow cover 20 includes a top wall 22, a bottom wall 26, a first side wall 24, and a second side wall 28 opposite the first side wall 24. The hollow cover 20 is transparent such that a driver is enabled to see through the cover 20 when the light shield 10 is arranged in front of the driver's view while driving. The top wall 22 and the bottom wall 26 extend between and interconnect the first side wall 24 and the second side wall 28. The cover 20 is hollowed out so as to form a hollow space 35 therein that extends from the first side wall 24 to the second side wall 28.

The hollow cover 20 further includes a front surface 30 that may be located closest to the driver when the light shield 10 is arranged on the sun visor 90 of the vehicle, and a rear surface 32 opposite the front surface 30. As more easily viewed in FIG. 3A, the first side wall 24 and the second side wall 28 each include an elongated slot 34, 36, respectively, formed therethrough, that form openings into the hollow space 35. The slots 34, 36 are configured to slidably support the slide 40 which is arranged within hollow space 35 of the hollow cover 20, the slide 40 being configured to be slid left and right within the slots 34, 36.

In the illustrative embodiment, the hollow cover 20 may be formed as a rectangular, prismatic shape. The top wall 22 may be parallel with the bottom wall 26, and the first side wall 24 may be parallel with the second side wall 28. In other embodiments, the hollow cover 20 may be square, and may include rounded corners. As can be seen in FIGS. 2 and 3, the top wall 22, or the longitudinal extent of the cover 20, has a first longitudinal length 23. In at least one embodiment, the first longitudinal length is in a range of 4 to 8 inches, and in particular may be equal to 6 inches. In some embodiments, this length may be adjusted in order to suit the particular design requirements of the vehicle in which the light shield 10 is being used or the requirements of the user.

For example, a larger vehicle such as a truck or tractor trailer, the slide 40 may be larger, thus requiring a larger cover 20, being 8 inches or even longer. In some embodiments, the cover 20 may have a height 25 that is in the range of 2 to 4 inches, and in particular, 2.75 inches. In some embodiments, this height may be adjusted in order to suit the particular design requirements of the vehicle in which the light shield 10 is being used or the requirements of the user. The cover 20 may also include a depth 27 (i.e. a width of the side walls 24, 28) of 1 inch. The hollow cover 20 may be formed of a rigid polymer material that can securely support the slide 40 within the cover 20.

Figure 3A:
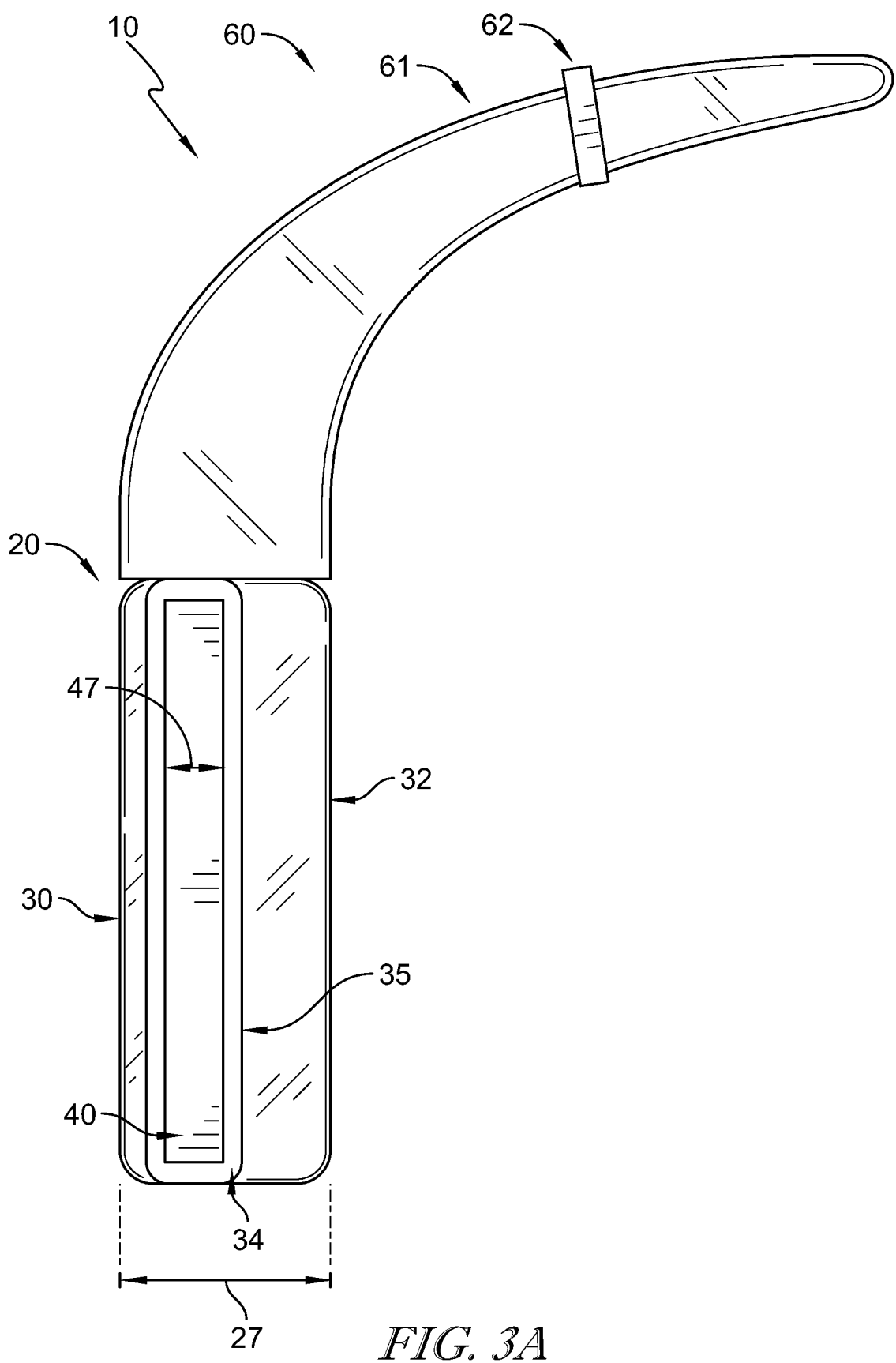
FIG. 3A is a side view of the adjustable light shield of FIG. 1, showing the strap in an unmounted arrangement in which the strap is not mounted on a sun visor.
Figure 3B:
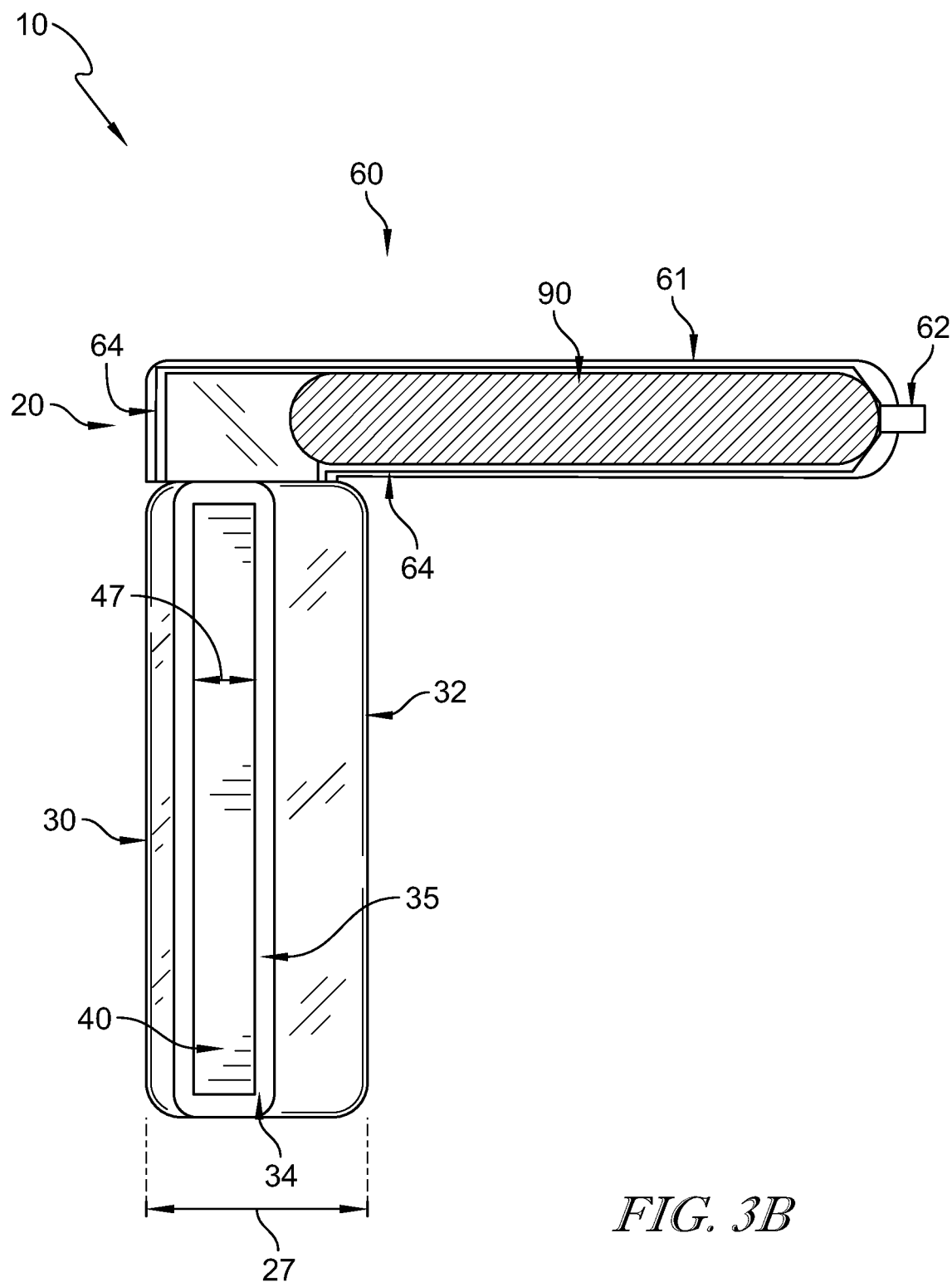
FIG. 3B is a side view of the adjustable light shield of FIG. 1.
Figure 4:
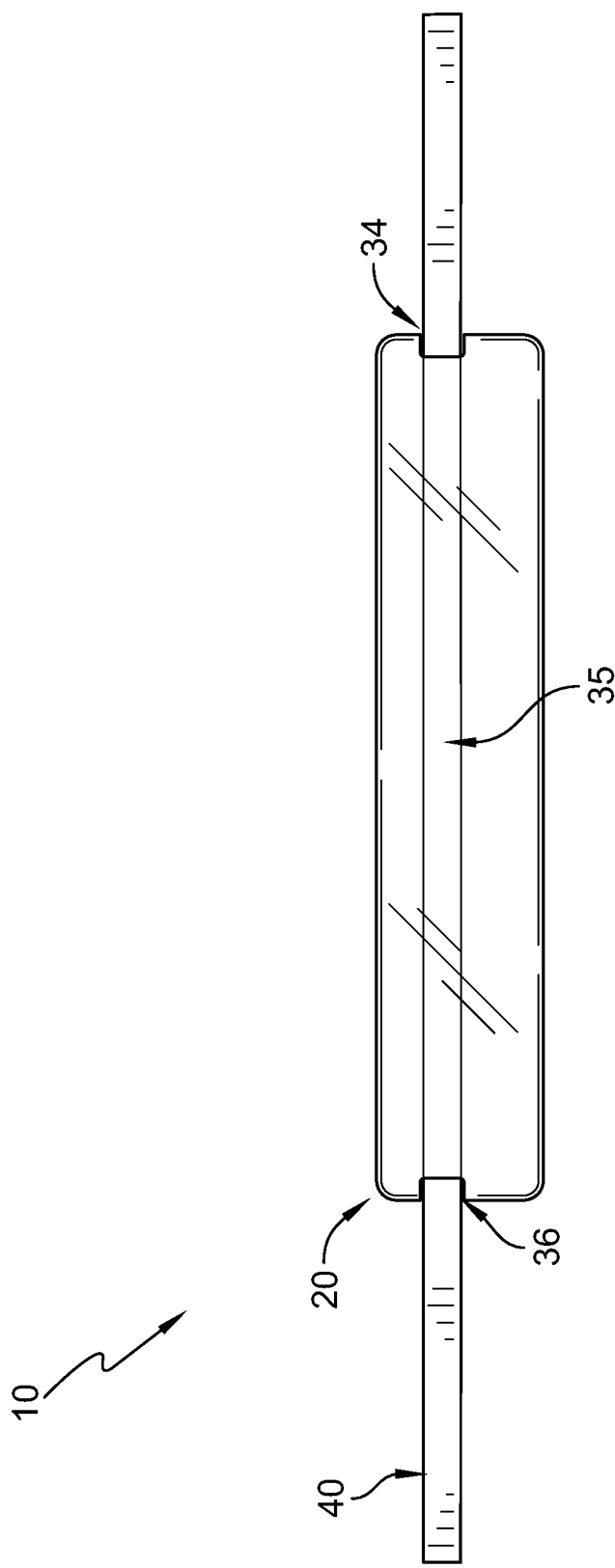
FIG. 4 is a top view of the adjustable light shield of FIG. 1.
Figure 5:
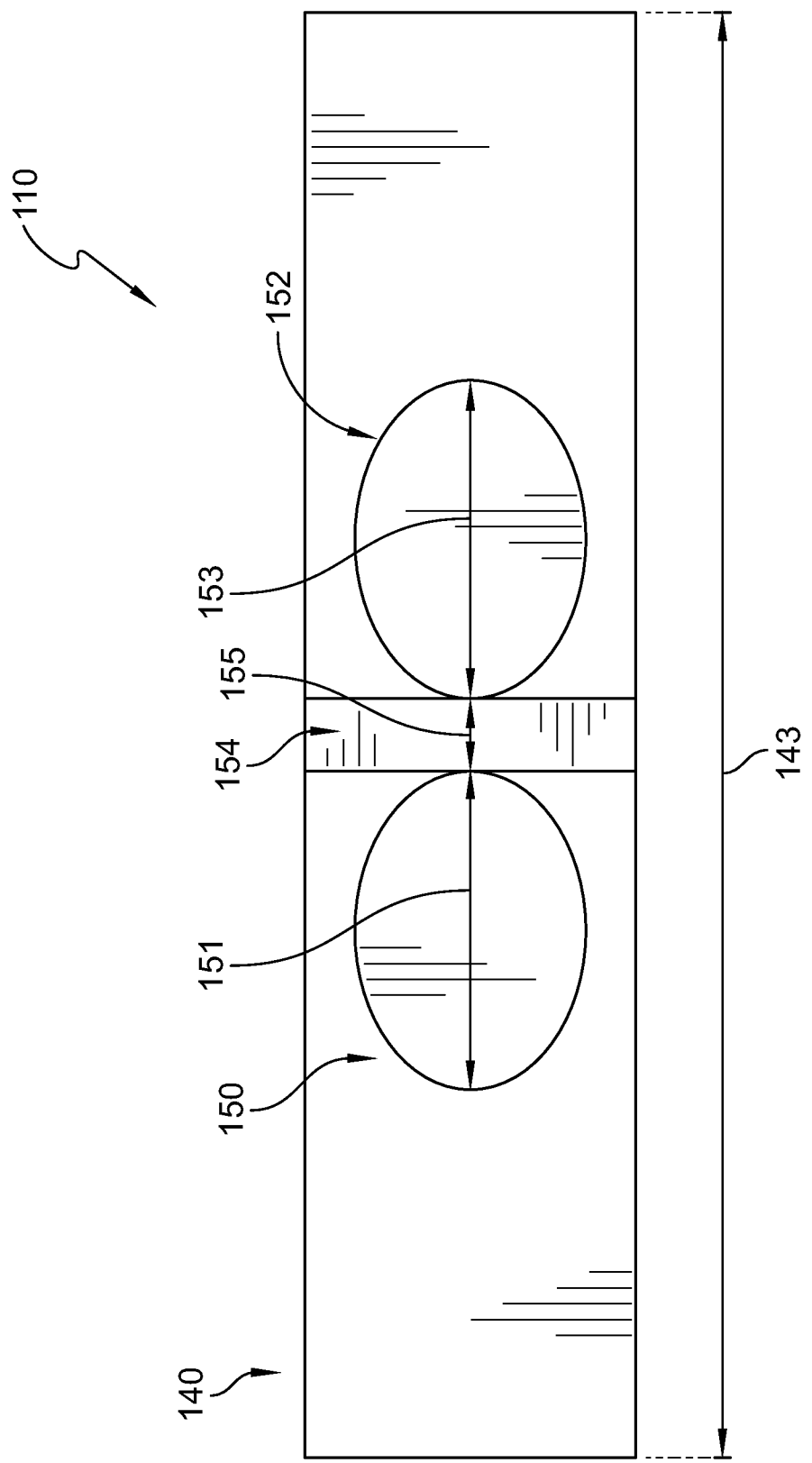
FIG. 5 is a front view of a slide of an adjustable light shield according to another aspect of the present disclosure, showing the slide having windows formed as ellipses.

As can be seen in FIGS. 2-4, the slide 40 is an elongated slide having a rectangular prismatic shape. The elongated slide 40 includes a top surface 42, a first side 44, a bottom surface 46 opposite the top surface 42, and a second side 48 opposite the first side 44. The top and bottom surface 42, 46 are configured to rest securely within the boundaries of the elongated slots 34, 36 of the hollow cover 20 such that the slide 40 does not tilt when being slid through the cover 20. In the illustrative embodiment, the top edge of the slide 40, and thus the top surface 42, is parallel with the top wall 22 of the hollow cover 20.

The elongated slide 40 further includes two windows 50, 52 formed therethrough. The windows 50, 52 are configured as eyeholes such that a driver of the vehicle can look through the hollow cover 20 and through the windows 50, 52 in order to see the road when the light shield 10 is arranged in position in front of the driver. In the illustrative embodiment, the first and second windows 50, 52 are formed as perfect circles having matching diameters. In other embodiments, other shapes and varying diameters may be used in order to suit the particular design requirements of the vehicle in which the light shield 10 is being used or the requirements of the user. For example, in at least one embodiment, one window of the two windows 50, 52 may be formed larger than the other window so as to accommodate abnormal vision issues of a driver. In at least one embodiment, one window of the two windows 50, 52 may be formed of a longitudinally longer shape than the other window so as to accommodate abnormal vision issues of a driver.

The first window 50 and the second window 52 are arranged relative to each other such that a light blocking portion 54 of the slide is located between the first window 50 and the second window 52. The light blocking portion 54 is a portion of the slide 40 itself that is located centrally along a longitudinal extent of the elongated slide 40. The light blocking portion 54 is configured to be utilized by the driver to block a light source present in the surrounding environment, typically the sun. The driver may slide the elongated slide 40 left and right in order to line up the light blocking portion 54 with the sun in order to block at least some of the sunlight being directed at the driver.

In some embodiments, the light blocking portion 54 includes a blocking strip 56 arranged on the front surface of the elongated slide 40 on top of the light blocking portion 54. The blocking strip 56 is a different color than a color of the elongated slide 40 so as to visually indicate movement of the elongated slide 40 to a user. In at least one embodiment, the blocking strip 56 is black and the elongated slide 40 is white such that the blocking strip 56, and thus the light blocking portion 54, are strongly visible to the driver. In some embodiments, the width of the blocking strip 56 is equal to the width of the light blocking portion 54.

In the illustrative embodiment, the elongated slide 40 has a longitudinal extent, or a second longitudinal length 43, that is larger than the first longitudinal length 23 of the hollow cover 20. In particular, in at least some embodiments, the second longitudinal length 43 is in the range of 8 to 12 inches, and in particular 10.5 inches for a standard vehicle size. In some embodiments, this length may be adjusted in order to suit the particular design requirements of the vehicle in which the light shield 10 is being used or the requirements of the user. For example, a larger vehicle such as a truck or tractor trailer, the slide 40 may be larger, being 12 inches or even longer. In some embodiments, the slide 40 may have a height 45 that is in the range of 2 to 4 inches, and in particular, 2.3 inches. In some embodiments, this height may be adjusted in order to suit the particular design requirements of the vehicle in which the light shield 10 is being used or the requirements of the user. The slide 40 may also include a depth (i.e. a width of the sides 44, 48) of 0.25 inches. The slide 40 may be formed of a rigid polymer material. In other embodiments, the slide 40 may be formed of a slightly flexible material that allows for some give while moving the slide 40.

In some embodiments, the slide 40 may be any shape other than rectangular and prismatic, such as circular, triangular, or any other polygonal shape as would be understood by a person skilled in the art. In some embodiments, the slide 40 may be curved away from the user (i.e. with the ends 44, 48 further away from the user than the central portion including the two windows 50, 52). In some embodiments, the slide 40 may be curved toward the user (i.e. with the ends 44, 48 closer to the user than the central portion including the two windows 50, 52).

Each window 50, 52 has a diameter 51, 53, respectively. In the illustrative embodiment, the diameters 51, 53 may each be equal to 2 inches. The diameter being 2 inches relative to the dimensions of the slide 40 described above allows for the driver to see the greatest portion of the road while not comprising the structural integrity of the slide 40 by having the edges of the windows 50, 52 too close to the edges of the slide 40. In other embodiments, the windows 50, 52 may include larger or smaller diameters based on the size of the slide 40 and the size of the cover 20.

In the illustrative embodiment, the light blocking portion 54 includes a width, in particular a second width 55 as referred to herein. The second width 55 of the light blocking portion 54 is equal to a distance between the first window 50 and the second window 52. In some embodiments, the second width is equal to 0.5 inches. In some embodiments, this width may be adjusted in order to suit the particular design requirements of the vehicle in which the light shield 10 is being used or the requirements of the user. For example, a larger vehicle such as a truck or tractor trailer, in particular in which the slide 40 is 12 inches or longer, the second width 55 may be equal to 0.75 inches. The second width 55 may be increased up to a point in which the light blocking portion 54 obstructs the view of the driver when centered in the driver's view.

The first and second sides 44, 48 of the elongated slide 40 extend beyond the boundaries of the hollow cover 20, in particular beyond the first and second side walls 24, 28. In the illustrative embodiment, the first side 44 of the elongated slide 40 extends beyond the first side wall 24 of the hollow cover 20 a first distance and the second side 48 of the elongated slide 40 extends beyond the second side wall 28 of the hollow cover 20 a second distance. The first distance and the second distance are larger than a third distance defined between the first window 50 and the first side wall 24 and a fourth distance between the second window 52 and the second side wall 28. These dimensions allow for the slide 40 to move within the boundaries of the hollow cover 20 and allows for the windows 50, 52 to move to at least the first and second sides 24, 28 of the cover 20.

In the illustrative embodiment, the elongated slide 40 includes a first stop 58 extending away from the first end 44 and a second stop 59 extending away from the second end 48 so as to prevent the elongated slide 40 from sliding beyond the elongated slots 34, 36 of the hollow cover 20.

The light shield 10 may further include an adjustable attachment assembly 60 coupled to the hollow cover 20 that is couplable to a mounting object. Illustratively, the attachment assembly 60 is shown coupled to a sun visor 90 of a vehicle. In at least one embodiment, the adjustable attachment assembly 60 includes an adjustable strap 61 and a strap adjuster 62, as shown in FIGS. 3A and 3B. As can be seen in FIG. 3A, the strap 61 may be flexible and stretchable so as to securely fit on any size of sun visor 90 or other similar surface. Ends of the strap 61 are coupled to the hollow cover 20 such that, when the strap 61 is attached to the sun visor 90, the cover 20, including the slide 40 therein, may hang from the sun visor 90.

The strap 61 is attached to the cover 20 in a central location such that the cover 20 and slide 40 are substantially vertical when hanging from the sun visor 90. In some embodiments, the strap 61 includes a deformable wire 64 or wires arranged therein as shown in FIG. 3B. The wires 64 may extend straight along a portion of the strap 61 that surrounds the visor, and then may be selectively bent to hold the cover 20 and slide 40 in place at the convenience of the driver, such as, for example, a 90 degree angle relative to the sun visor 90 as shown in FIG. 3B.

Another embodiment of an adjustable light shield 110 in accordance with the present disclosure is shown in FIG. 5. The adjustable light shield 110 is substantially similar to the adjustable light shield 10 described herein. Accordingly, similar reference numbers in the 100 series indicate features that are common between the adjustable light shield 110 and the adjustable light shield 10. The descriptions of the adjustable light shield 10 are incorporated by reference to apply to the adjustable light shield 110, except in instances when it conflicts with the specific description and the drawings of the adjustable light shield 110. Any combination of the components of the adjustable light shield 10 and the adjustable light shield 110 described in further detail below may be utilized in an assembly of the present disclosure.

The adjustable light shield 110 includes similar components as the adjustable light shield 10, including a hollow cover 20 and an elongated slide 140, as shown in FIG. 5. Unlike the elongated slide 40, the elongated slide 140 includes a longer length 143, in particular in the range of 10 to 14 inches, and more specifically, 12 inches. Given this greater surface area, the windows 150, 152 are formed to be larger than the windows 50, 52 of the adjustable light shield 10. Specifically, the windows 150, 152 are formed as wide ellipse shapes having equal widths 151, 153 of approximately 2.75 inches. The light blocking portion 154 of the slide 140 has a width 155 of 0.75 inches. The longer lengths 143, 151, 153, 155 allow for maximizing the visible road and environment when the light shield 110 is placed in front of the driver's field of vision.

Another embodiment of an adjustable light shield 210 in accordance with the present disclosure is shown in FIGS. 6-8. The adjustable light shield 210 is substantially similar to the adjustable light shields 10, 110 described herein. Accordingly, similar reference numbers in the 200 series indicate features that are common between the adjustable light shield 210 and the adjustable light shields 10, 110. The descriptions of the adjustable light shields 10, 110 are incorporated by reference to apply to the adjustable light shield 210, except in instances when it conflicts with the specific description and the drawings of the adjustable light shield 210. Any combination of the components of the adjustable light shields 10, 110 and the adjustable light shield 210 described in further detail below may be utilized in an assembly of the present disclosure.

The adjustable light shield 210 includes similar components as the adjustable light shields 10, 110, including a hollow cover 220, an elongated slide 240, and an adjustable attachment assembly 260, as shown in FIG. 6. In some embodiments, the slide 240 may additionally include a grip 249 on one side 244 of the slide 240. The slide 240 may include a grip 249 on the opposing side 248 of the slide 240 or on both sides 244, 248 of the slide 240.

Unlike the adjustable attachment assembly 60, the adjustable attachment assembly 260 includes a clamp 262 and a rotatable member 270 fixedly coupled to the hollow cover 220 so as to allow the hollow cover 220 to be positioned at a desirable angle relative to the clamp 262. As shown in FIGS. 6-7B, the clamp 262 includes a resilient top clamp wall 263 and a resilient bottom clamp wall 264 configured to exert force toward each other when mounted on an object slightly thicker than the distance between the walls 263, 264, such as a sun visor 90. In some embodiments, the adjustable attachment assembly 260 can include multiple clamps 262, such as two clamps 262 disposed near opposing lateral ends of the hollow cover 220. In some embodiments, the adjustable attachment assembly 260. The adjustable attachment assembly 260 may include more than one clamp 262, such as two clamps 262 as shown in FIG. 7B, or more than two clamps 262, as would be required by the application or design as would be understood by a person skilled in the art.

As can be seen in FIG. 8, the clamp 262 is rotatably coupled to the rotatable member 270 via a pair of cantilevered arms 266 that extend away from the clamp 262 on opposing sides of the rotatable member 270 and support the rotatable member 270 for rotation thereabout (the opposing side arm 266 cannot be seen in FIGS. 6-8). The rotatable member 270 is generally cylindrical and the flat ends of the cylinder are rotatably coupled to the arms 266 at attachment points 268 via pins or other fastening members known in the art. The clamp 262 further includes a protrusion 267 extending away from the clamp 262 toward the rotatable member 270.

The rotatable member 270 is coupled to the hollow cover 220 via a support wall 274 extending from the rotatable member 270 to the hollow cover 220, as shown in FIGS. 6-8. As can be seen in greater detail in FIGS. 7 and 8, the rotatable member 270 includes a plurality of ribs 272 extending away from an outer circumferential surface of the cylindrical rotatable member 270. The ribs 272 form troughs therebetween that are configured to engage with the protrusion 267 of the clamp 262. The protrusion 267 and ribs 272 are formed to be resilient enough such that a user may rotate the hollow cover 220 relative to the clamp 262 while providing enough resistance to hold the hollow cover 220 in each position defined by a trough of the ribs 272.

Another embodiment of an adjustable light shield 310 in accordance with the present disclosure is shown in FIGS. 9 and 10. The adjustable light shield 310 is substantially similar to the adjustable light shields 10, 110, 210 described herein. Accordingly, similar reference numbers in the 300 series indicate features that are common between the adjustable light shield 310 and the adjustable light shields 10, 110, 210. The descriptions of the adjustable light shields 10, 110, 210 are incorporated by reference to apply to the adjustable light shield 310, except in instances when it conflicts with the specific description and the drawings of the adjustable light shield 310. Any combination of the components of the adjustable light shields 10, 110, 210 and the adjustable light shield 310 described in further detail below may be utilized in an assembly of the present disclosure.

The adjustable light shield 310 includes similar components as the adjustable light shields 10, 110, 210 including a hollow cover 320, an elongated slide (not shown), and an adjustable attachment assembly 360, as shown in FIGS. 9 and 10. Similar to the adjustable attachment assembly 260, the adjustable attachment assembly 360 includes a clamp 362 including a resilient top clamp wall 363 and a resilient bottom clamp wall 364 configured to exert force toward each other when mounted on an object slightly thicker than the distance between the walls 363, 364, such as a sun visor 90. Unlike the adjustable attachment assembly 260, the adjustable attachment assembly 360 includes a rigid coupling member 365 that couples the clamp 362 to the hollow cover 320.

As shown in FIG. 10, the coupling member 365 includes a first wall 366 coupled to the clamp 362 and a second wall 369 coupled to the first wall 366 and extending downwardly toward the hollow cover 320. In some embodiments, the angle between the first wall 366 and the second wall 369 may be 90 degrees, but other angles may be used based on the requirements of the design. The second wall 369 is configured to slidably engage with the hollow cover 320 so as to allow the hollow cover 320 to be slid relative to the user and relative to the clamp 362, which is fixed in place on the sun visor 90.

In order to slidably engage the hollow cover 320, the second wall 369 includes a first lip 372 on a front side of the wall 369 and a second lip 374 on a rear side of the wall 369, as shown in FIG. 10. The lips 372, 374 extend along the entire length of the wall 369 so as to provide optimal support for the hollow cover 320. Correspondingly, the top surface of the hollow cover 320 includes a recess 332 in which the lips 372, 374 are arranged for sliding therewithin. The recess 332 is defined by a front support wall 333 extending upwardly from the top surface of the hollow cover 320 and a rear support wall 334 extending upwardly from the top surface of the hollow cover 320. The front support wall 333 includes a first support lip 335 extending inwardly from the wall 333, and the rear support wall 335 includes a second support lip 336 extending inwardly from the wall 334. The lips 335, 336 form sliding recesses 337, 338 within which the lips 372, 374 of the second wall 369 can slide so as to allow the user to slide the hollow cover 320 left and right relative to the sun visor 90 during use.

Another embodiment of an adjustable light shield 410 in accordance with the present disclosure is shown in FIG. 11. The adjustable light shield 410 is substantially similar to the adjustable light shields 10, 110, 210, 310 described herein. Accordingly, similar reference numbers in the 400 series indicate features that are common between the adjustable light shield 410 and the adjustable light shields 10, 110, 210, 310. The descriptions of the adjustable light shields 10, 110, 210, 310 are incorporated by reference to apply to the adjustable light shield 410, except in instances when it conflicts with the specific description and the drawings of the adjustable light shield 410. Any combination of the components of the adjustable light shields 10, 110, 210, 310 and the adjustable light shield 410 described in further detail below may be utilized in an assembly of the present disclosure.

The adjustable light shield 410 includes similar components as the adjustable light shields 10, 110, 210, 310 including a hollow cover 420, an elongated slide (not shown), and an adjustable attachment assembly 460, as shown in FIG. 11. Similar to the adjustable attachment assembly 360, the adjustable attachment assembly 460 includes a clamp 462 including a resilient top clamp wall 463 and a resilient bottom clamp wall 464 configured to exert force toward each other when mounted on an object slightly thicker than the distance between the walls 463, 464, such as a sun visor 90.

Unlike the adjustable attachment assembly 360, the adjustable attachment assembly 460 includes a rigid coupling member 465 that rigidly couples the clamp 462 to the hollow cover 420. In particular, the hollow cover 420 is not configured to slide relative to the rigid coupling member 465, but instead is rigidly coupled thereto. As shown in FIG. 11, the coupling member 465 includes a first wall 466 coupled to the clamp 462 and a second wall 469 coupled to the first wall 466 and extending downwardly toward the hollow cover 420. In some embodiments, the angle between the first wall 466 and the second wall 469 may be 90 degrees, but other angles may be used based on the requirements of the design.

Additional clamps 262', 262" that may be utilized with the adjustable light shield 210 described above, or any of the adjustable light shield embodiments described herein, are shown in FIGS. 12A-12C. For example, as shown in FIG. 12A, the clamp 262' may be similar to the clamp 262 described above, but instead includes a curved bottom clamp wall 264' which includes an inclined portion 265' that rises from a curved portion 267' that extends between the top clamp wall 263' and the bottom clamp wall 264' and to a clamp lip 266'. The additional inclined portion 265' reduces the gap between the walls 263', 264' thereby providing additional force for holding an adjustable light shield on the sun visor 90.

As shown in FIGS. 12B and 12C, the clamp 262" may be similar to the clamp 262' described above, but instead includes a kinked portion 267" instead of a curved portion 265' extending between the top clamp wall 263" and the bottom clamp wall 264". The two clamp walls 263", 264" converge toward each other as they extend away from the kinked portion 265". The convergence reduces the gap between the walls 263", 264" thereby providing additional force for holding an adjustable light shield on the sun visor 90.

FIG. 12D shows an adjustable attachment assembly 260''' that may be utilized with the adjustable light shield 10 described above, or any of the adjustable light shield embodiments described herein. The adjustable attachment assembly 260''' includes a forward coupling member 262''' configured to wrap around a front edge of the sun visor 90, a rear coupling member 264''' configured to wrap around a rear edge of the sun visor 90, and a mounting plate 263''' coupled to the rearward coupling member 264'''. Sliding rods 265''' extend away the forward coupling member 262''' and into the mounting plate 263'''. The forward coupling member 262''' is adjustable relative to the rearward coupling member 264''' via the sliding rods 265''' selectively lockingly moving relative to the mounting plate 263''', in particular the sliding rods 265''' selectively lockingly entering the mounting plate 263'''. The slide mounting plate 263''' includes a slide track 266''' formed on a lower surface thereof, and a slide rod 267''' that is slidable within the slide track 266'''. The slide rod 267''' may be rotatably coupled to an attachment member 268''' which is rigidly coupled to the hollow cover 20.

Another embodiment of an adjustable light shield 510 in accordance with the present disclosure is shown in FIGS. 13-15. The adjustable light shield 510 is substantially similar to the adjustable light shields 10, 110, 210, 310, 410 described herein. Accordingly, similar reference numbers in the 500 series indicate features that are common between the adjustable light shield 510 and the adjustable light shields 10, 110, 210, 310, 410. The descriptions of the adjustable light shields 10, 110, 210, 310, 410 are incorporated by reference to apply to the adjustable light shield 510, except in instances when it conflicts with the specific description and the drawings of the adjustable light shield 510. Any combination of the components of the adjustable light shields 10, 110, 210, 310, 410 and the adjustable light shield 510 described in further detail below may be utilized in an assembly of the present disclosure.

The adjustable light shield 510 includes similar components as the adjustable light shields 10, 110, 210, 310, 410 including a hollow cover 420, an elongated slide (not shown), and an adjustable attachment assembly 560, as shown in FIG. 13. Similar to the adjustable attachment assembly 460, the adjustable attachment assembly 560 includes a clamp 562 including a resilient top clamp wall 563 and a resilient bottom clamp wall 564 configured to exert force toward each other when mounted on an object slightly thicker than the distance between the walls 563, 564, such as a sun visor 90.

Similar to the adjustable attachment assembly 460, the adjustable attachment assembly 560 includes a rigid coupling member 565 that rigidly couples the clamp 562 to the hollow cover 520, as can be seen in FIG. 14. Unlike the coupling member 465, the coupling member 565 is coupled to the clamp 562 on an underside of the resilient bottom clamp wall 564 and extends downwardly toward the hollow cover 520. In some embodiments, the coupling member 565 is coupled to the resilient bottom clamp wall 564 so as to be spaced apart from the forward curvature of the clamp 562 formed between the top and bottom clamp walls 563, 564, as shown in FIG. 14.

In some embodiments, the coupling member 565 can be coupled to the clamp 562 on the underside of the resilient bottom clamp wall 564 via a rotatable member 570, as shown in FIG. 15. Similar to the rotatable member 270 described above, the rotatable member 570 is fixedly coupled to the hollow cover 520 so as to allow the hollow cover 520 to be positioned at a desirable angle relative to the clamp 562. As can be seen in FIG. 15, the clamp 562 is rotatably coupled to the rotatable member 570 via a pair of cantilevered arms 566 that extend away from the clamp 562 on opposing sides of the rotatable member 570 and support the rotatable member 570 for rotation thereabout (the opposing side arm 566 cannot be seen in FIG. 15). The rotatable member 570 is generally cylindrical and the flat ends of the cylinder are rotatably coupled to the arms 566 at attachment points 568 via pins or other fastening members known in the art. The clamp 562 further includes a protrusion 567 extending away from the clamp 562 toward the rotatable member 570.

The rotatable member 570 is coupled to the hollow cover 520 via the wall 565 extending from the rotatable member 570 to the hollow cover 520, as shown in FIG. 15. The rotatable member 570 includes a plurality of ribs 572 extending away from an outer circumferential surface of the cylindrical rotatable member 570. The ribs 572 form troughs therebetween that are configured to engage with the protrusion 567 of the clamp 562. The protrusion 567 and ribs 572 are formed to be resilient enough such that a user may rotate the hollow cover 520 relative to the clamp 562 while providing enough resistance to hold the hollow cover 520 in each position defined by a trough of the ribs 572.

Another embodiment of an adjustable light shield 610 in accordance with the present disclosure is shown in FIGS. 16A and 16B. The adjustable light shield 610 is substantially similar to the adjustable light shields 10, 110, 210, 310, 410, 510 described herein. Accordingly, similar reference numbers in the 600 series indicate features that are common between the adjustable light shield 610 and the adjustable light shields 10, 110, 210, 310, 410, 510. The descriptions of the adjustable light shields 10, 110, 210, 310, 410, 510 are incorporated by reference to apply to the adjustable light shield 610, except in instances when it conflicts with the specific description and the drawings of the adjustable light shield 610. Any combination of the components of the adjustable light shields 10, 110, 210, 310, 410, 510 and the adjustable light shield 610 described in further detail below may be utilized in an assembly of the present disclosure.

The adjustable light shield 610 includes similar components as the adjustable light shields 10, 110, 210, 310, 410, 510 including a hollow cover 620 and an adjustable attachment assembly 660, as shown in FIG. 16A. Similar to the adjustable attachment assembly 260, the adjustable attachment assembly 660 includes clamps 662 including a resilient top clamp wall 663 and a resilient bottom clamp wall 664 configured to exert force toward each other when mounted on an object slightly thicker than the distance between the walls 663, 664, such as a sun visor 90. Unlike the adjustable attachment assembly 660, the adjustable attachment assembly 660 includes a coupling rail 665 which the clamps 662 are rotatably coupled. The hollow cover 620 is slidably attached to the coupling rail 665 so as to slide relative thereto.

As shown in FIG. 16A, the adjustable attachment assembly 660 includes at least one clamp 662, and in particular two clamps 662 in some embodiments, the clamps 662 formed similarly to the clamps 262 described above, although any clamps described herein may be utilized as well as additional attachment means understood by a person skilled in the art. The clamps 662 are rotatably attached to the coupling rail 665 within end recesses 667 formed between end portions 665E of the rail 665 and a central portion 665C of the rail 665. In some embodiments, an additional piece of opaque material 670 may extend away from the central portion 665C of the rail 665 in order to further block light from shining between the visor 90 and the top of the adjustable attachment assembly 660 (i.e. the top of the central portion 665C of the rail 665 and between the clamps 662).

In order to slidably engage the hollow cover 620, the rail 665 includes a first lip 668 on a front side of the rail 665 and a second lip 669 on a rear side of the rail 665, as shown in FIG. 16B. The lips 668, 669 extend along the entire length of the rail 665 so as to provide optimal support for the hollow cover 620 as well as to allow the cover 620 space to slide. Correspondingly, the top surface of the hollow cover 620 includes a top cover rail 630 including a recess 632 formed therein. The recess 632 includes a first groove 633 and a second groove 634 opposite the first groove 634. The first groove 633 extends along a first inner wall of the recess 632 and the second groove 634 extends along a second inner wall of the recess 632 opposite the first wall. The lips 668, 669 are arranged within the grooves 633, 634 for sliding therein.

Illustratively, the hollow cover 620 is transparent and includes a blocking strip 656 arranged on the front surface of the hollow cover 620. The blocking strip 656 is stationary on the hollow cover 620 such that, when a user slides the cover 620 laterally in the directions 636, 637, the blocking strip 656 can be positioned as desired by the user to block obstructing objects from view, such as the sun.

Another embodiment of an adjustable light shield 710 in accordance with the present disclosure is shown in FIG. 17. The adjustable light shield 710 is substantially similar to the adjustable light shields 10, 110, 210, 310, 410, 510, 610 described herein. Accordingly, similar reference numbers in the 700 series indicate features that are common between the adjustable light shield 710 and the adjustable light shields 10, 110, 210, 310, 410, 510, 610. The descriptions of the adjustable light shields 10, 110, 210, 310, 410, 510, 610 are incorporated by reference to apply to the adjustable light shield 710, except in instances when it conflicts with the specific description and the drawings of the adjustable light shield 710. Any combination of the components of the adjustable light shields 10, 110, 210, 310, 410, 510, 610 and the adjustable light shield 710 described in further detail below may be utilized in an assembly of the present disclosure.

The adjustable light shield 710 includes similar components as the adjustable light shields 10, 110, 210, 310, 410, 510, 610 including a hollow cover 720 and an adjustable attachment assembly 760, as shown in FIG. 17. Similar to the adjustable attachment assembly 260, the adjustable attachment assembly 760 includes two clamps 762 including a resilient top clamp wall 763 and a resilient bottom clamp wall 764 configured to exert force toward each other when mounted on an object slightly thicker than the distance between the walls 763, 764, such as a sun visor 90. Each clamp 762 of the adjustable attachment assembly 760 is rotatably coupled to the hollow cover 720.

As shown in FIG. 17, the hollow cover 720 is transparent and stationary relative to the clamps 762 and includes a blocker 730 arranged on the hollow cover 720. The blocker 730 is movable on the hollow cover 720 in any direction 733, 734, 735, 736 on the front surface of the cover 720, or in other words, in any two-dimensional direction on the cover 720. As such, a user can position the blocker 730 as desired to block obstructing objects from view, such as the sun. In some embodiments, the blocker 730 includes a front member 731 arranged on the front surface of the cover 720 and a rear member 732 arranged on the rear surface of the cover 720 that are magnetically attracted toward each other so as to secure each member 731, 732 to the cover 720.

Another embodiment of an adjustable light shield 810 in accordance with the present disclosure is shown in FIG. 18. The adjustable light shield 810 is substantially similar to the adjustable light shields 10, 110, 210, 310, 410, 510, 610, 710 described herein. Accordingly, similar reference numbers in the 800 series indicate features that are common between the adjustable light shield 810 and the adjustable light shields 10, 110, 210, 310, 410, 510, 610, 710. The descriptions of the adjustable light shields 10, 110, 210, 310, 410, 510, 610, 710 are incorporated by reference to apply to the adjustable light shield 810, except in instances when it conflicts with the specific description and the drawings of the adjustable light shield 810. Any combination of the components of the adjustable light shields 10, 110, 210, 310, 410, 510, 610, 710 and the adjustable light shield 810 described in further detail below may be utilized in an assembly of the present disclosure.

The adjustable light shield 810 includes similar components as the adjustable light shields 10, 110, 210, 310, 410, 510, 610, 710 including a hollow cover 820 and an adjustable attachment assembly 860, as shown in FIG. 18. Similar to the adjustable attachment assembly 260, the adjustable attachment assembly 860 includes two clamps 862 including a resilient top clamp wall 863 and a resilient bottom clamp wall 864 configured to exert force toward each other when mounted on an object slightly thicker than the distance between the walls 863, 864, such as a sun visor 90. Each clamp 862 of the adjustable attachment assembly 860 is rotatably coupled to the hollow cover 820.

As shown in FIG. 18, the hollow cover 820 is transparent and stationary relative to the clamps 862 and includes a blocker strip 830 arranged on the hollow cover 820. The blocker strip 830 includes a bottom sliding grip 831 and a top sliding grip 832 that are each slidable along the top and bottom edges of the hollow cover 820. The blocker strip 830 is slidable on the hollow cover 820 in the lateral direction 833, 834 on the front surface of the cover 820. As such, a user can position the blocker strip 830 as desired to block obstructing objects from view, such as the sun.

Another embodiment of an adjustable light shield 910 in accordance with the present disclosure is shown in FIG. 19. The adjustable light shield 910 is substantially similar to the adjustable light shields 10, 110, 210, 310, 410, 510, 610, 710, 810 described herein. Accordingly, similar reference numbers in the 800 series indicate features that are common between the adjustable light shield 910 and the adjustable light shields 10, 110, 210, 310, 410, 510, 610, 710, 810. The descriptions of the adjustable light shields 10, 110, 210, 310, 410, 510, 610, 710, 810 are incorporated by reference to apply to the adjustable light shield 910, except in instances when it conflicts with the specific description and the drawings of the adjustable light shield 910. Any combination of the components of the adjustable light shields 10, 110, 210, 310, 410, 510, 610, 710, 810 and the adjustable light shield 910 described in further detail below may be utilized in an assembly of the present disclosure.

The adjustable light shield 910 includes similar components as the adjustable light shields 10, 110, 210, 310, 410, 510, 610, 710, 810 including a hollow cover 920, a slide 940, and an adjustable attachment assembly 860, as shown in FIG. 19. Similar to the adjustable attachment assembly 260, the adjustable attachment assembly 960 includes a clamp 962 for attachment to a sun visor 90 or other similar surface. The clamp 962 of the adjustable attachment assembly 860 can be coupled to the hollow cover 920 rigidly or rotatably.

As shown in FIG. 19, the hollow cover 920 is transparent and stationary relative to the clamp 962. The slide 940, similar to the slide 40 described above, is configured to slide within the hollow cover 920. Unlike the slide 40, the slide 940 is transparent like the cover 920. A blocker strip 956 is arranged centrally on the slide 940. As such, a user can position the slide 940, and thus the blocker strip 956, relative to the cover 920 as desired to block obstructing objects from view, such as the sun.

A method according to the present disclosure includes providing a hollow cover including a first side wall, a second side wall opposite to the first side wall, and a top wall extending between and interconnecting the first side wall and the second side wall, the hollow cover being transparent so as to enable a user to see through the cover, the first side wall and the second side wall each including an elongated slot formed therein, the top wall having a first longitudinal length.

The method may further include arranging an elongated slide within the elongated slots of the first side wall and the second side wall such that the elongated slide is slidably supported by the elongated slots so as to enable the slide to slidably move through the elongated slots and slidably move relative to the hollow cover, the elongated slide having a second longitudinal length that is larger than the first longitudinal length of the top wall of the hollow cover, the elongated slide including a first window formed therethrough and a second window formed therethrough spaced apart longitudinally from the first window, the first window and the second window being arranged relative to each other such that a light blocking portion of the slide located between the first window and the second window is located centrally along a longitudinal extent of the elongated slide.

The method may further include sliding the elongated slide relative to the hollow cover into a first position such that a light source present in an environment surrounding the adjustable light shield is at least partially blocked by the light blocking portion of the slide.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims.

The invention claimed is:

1. An adjustable light shield, comprising:
   a hollow cover including a first side wall, a second side wall opposite to the first side wall, and a top wall extending between and interconnecting the first side wall and the second side wall, the hollow cover being transparent so as to enable a user to see through the cover, the first side wall and the second side wall each including an elongated slot formed therethrough, the top wall having a first longitudinal length; and
   an elongated slide including a first window formed therethrough and a second window formed therethrough spaced apart longitudinally from the first window so as to define a light blocking portion of the elongated slide therebetween, the elongated slide having a second longitudinal length that is larger than the first longitudinal length of the top wall of the hollow cover, the elongated slide arranged within and supported by the elongated slots of the first side wall and the second side wall so as to enable the elongated slide to slidably move through the elongated slots and slidably move relative to the hollow cover,
   wherein the elongated slide is configured to be slid relative to the hollow cover into a first position such that a light source present in an environment surrounding the adjustable light shield is at least partially blocked by the light blocking portion of the elongated slide.

2. The adjustable light shield of claim 1, wherein the elongated slide extends beyond the first side wall of the hollow cover a first distance and extends beyond the second side wall of the hollow cover a second distance, and wherein the first distance and the second distance are larger than a third distance between the first window and the first side wall and a fourth distance between the second window and the second side wall.

3. The adjustable light shield of claim 2, wherein the elongated slide includes a first end and a second end longitudinally opposite the first end, and wherein the elongated slide includes a first stop extending away from the first end and a second stop extending away from the second end so as to prevent the elongated slide from sliding beyond the elongated slots of the hollow cover.

4. The adjustable light shield of claim 3, wherein the elongated slide further includes a blocking strip arranged on a front surface of the elongated slide on the light blocking portion, and wherein the blocking strip is a different color than a color of the elongated slide so as to visually indicate movement of the elongated slide to a user.

5. The adjustable light shield of claim 4, wherein the elongated slide includes a top edge that is parallel with the top wall of the hollow cover, wherein the first side wall and the second side wall of the hollow cover are parallel with each other, and wherein the first window and the second window are arranged relative to each other such that a light blocking portion of the elongated slide located between the first window and the second window is located centrally along a longitudinal extent of the elongated slide.

6. The adjustable light shield of claim 5, wherein a first width of the blocking strip is equal to a second width of the light blocking portion.

7. The adjustable light shield of claim 6, wherein the second width of the light blocking portion is equal to a distance between the first window and the second window, and wherein the second width is equal to 0.5 inches.

8. The adjustable light shield of claim 5, wherein the first window is circular and the second window is circular, and wherein the first window and the second window have equal diameters.

9. The adjustable light shield of claim 8, wherein the first window has a diameter of 2 inches and the second window has a diameter of 2 inches.

10. The adjustable light shield of claim 5, wherein the first longitudinal length of the elongated slide is equal to 10.5 inches, and wherein the second longitudinal length of the top wall of the hollow cover is equal to 6 inches.

11. The adjustable light shield of claim 10, wherein a first height of the elongated slide is equal to 2.3 inches, and wherein a second height of the hollow cover is equal to 2.75 inches.

12. The adjustable light shield of claim 5, wherein the first longitudinal length of the elongated slide is equal to 12 inches, and wherein the second longitudinal length of the top wall of the hollow cover is equal to 6 inches.

13. A system for at least partially eliminating sunlight visible through a windshield of a vehicle, comprising:
   an adjustable light shield configured to be attached to a sun visor of the vehicle, the adjustable light shield including:
   a hollow cover including a first side wall, a second side wall opposite to the first side wall, and a top wall extending between and interconnecting the first side wall and the second side wall, the hollow cover being transparent so as to enable a user to see through the cover, the first side wall and the second side wall each including an elongated slot formed therethrough, the top wall having a first longitudinal length; and
   an elongated slide including a first window formed therethrough and a second window formed therethrough spaced apart longitudinally from the first window so as to define a light blocking portion of the elongated slide therebetween, the elongated slide having a second longitudinal length that is larger than the first longitudinal length of the top wall of the hollow cover, the elongated slide arranged within and supported by the elongated slots of the first side wall and the second side wall so as to enable the slide to slidably move through the elongated slots and slidably move relative to the hollow cover, wherein the elongated slide is configured to be slid relative to the hollow cover into a first position such that a light source present in an environment surrounding the adjustable light shield is at least partially blocked by the light blocking portion of the elongated slide; and an attachment strap coupled to the hollow cover and configured to be coupled to the sun visor of the vehicle so as to secure the adjustable light shield to the sun visor.

14. The system of claim 13, wherein the elongated slide extends beyond the first side wall of the hollow cover a first distance and extends beyond the second side wall of the hollow cover a second distance, and wherein the first distance and the second distance are larger than a third distance between the first window and the first side wall and a fourth distance between the second window and the second side wall.

15. The system of claim 14, wherein the elongated slide includes a first end and a second end longitudinally opposite the first end, and wherein the elongated slide includes a first stop extending away from the first end and a second stop extending away from the second end so as to prevent the elongated slide from sliding beyond the elongated slots of the hollow cover.

16. The system of claim 15, wherein the elongated slide further includes a blocking strip arranged on a front surface of the elongated slide on the light blocking portion, and wherein the blocking strip is a different color than a color of the elongated slide so as to visually indicate movement of the elongated slide to a user.

17. The system of claim 16, wherein the elongated slide includes a top edge that is parallel with the top wall of the hollow cover, wherein the first side wall and the second side wall of the hollow cover are parallel with each other, and wherein the first window and the second window are arranged relative to each other such that a light blocking portion of the slide located between the first window and the second window is located centrally along a longitudinal extent of the elongated slide.

18. The system of claim 17, wherein a first width of the blocking strip is equal to a second width of the light blocking portion.

19. A method of blocking a light source, comprising:
providing a hollow cover including a first side wall, a second side wall opposite to the first side wall, and a top wall extending between and interconnecting the first side wall and the second side wall, the hollow cover being transparent so as to enable a user to see through the cover, the first side wall and the second side wall each including an elongated slot formed therethrough, the top wall having a first longitudinal length;
arranging an elongated slide within the elongated slots of the first side wall and the second side wall such that the elongated slide is slidably supported by the elongated slots so as to enable the elongated slide to slidably move through the elongated slots and slidably move relative to the hollow cover, the elongated slide having a second longitudinal length that is larger than the first longitudinal length of the top wall of the hollow cover, the elongated slide including a first window formed therethrough and a second window formed therethrough spaced apart longitudinally from the first window so as to define a light blocking portion of the elongated slide therebetween; and
sliding the elongated slide relative to the hollow cover into a first position such that a light source present in an environment surrounding the hollow cover and the elongated slide is at least partially blocked by the light blocking portion of the elongated slide.

20. The method of claim 19, wherein the elongated slide extends beyond the first side wall of the hollow cover a first distance and extends beyond the second side wall of the hollow cover a second distance, and wherein the first distance and the second distance are larger than a third distance between the first window and the first side wall and a fourth distance between the second window and the second side wall.

* * * * *